United States Patent
Mango

(10) Patent No.: US 7,477,966 B1
(45) Date of Patent: Jan. 13, 2009

(54) PROPELLANT MANAGEMENT SYSTEM AND METHOD FOR MULTIPLE BOOSTER ROCKETS

(75) Inventor: Frank S. Mango, Littleton, CO (US)

(73) Assignee: Lockheed Martin Corporation, Bethesda, MD (US)

(*) Notice: Subject to any disclaimer, the term of this patent is extended or adjusted under 35 U.S.C. 154(b) by 438 days.

(21) Appl. No.: 11/060,672

(22) Filed: Feb. 17, 2005

Related U.S. Application Data

(60) Provisional application No. 60/546,524, filed on Feb. 20, 2004, provisional application No. 60/557,603, filed on Mar. 30, 2004.

(51) Int. Cl.
*B64G 1/42* (2006.01)

(52) U.S. Cl. .............. 701/13; 60/250; 60/251; 60/257; 60/600; 60/39.27

(58) Field of Classification Search ............ 701/13; 60/204, 250, 251, 257, 255, 600, 39.27, 602, 60/324, 790, 39.26
See application file for complete search history.

(56) References Cited

U.S. PATENT DOCUMENTS

| | | | | |
|---|---|---|---|---|
| 3,882,676 A * | 5/1975 | Schmidt | ............ | 60/245 |
| 4,840,025 A | 6/1989 | Coffinberry | ............ | 701/13 |
| 4,898,030 A | 2/1990 | Yeh | ............ | 73/290 |
| 4,908,776 A | 3/1990 | Crill et al. | ............ | 364/509 |
| 4,934,242 A * | 6/1990 | Bulman | ............ | 89/7 |
| 5,148,674 A * | 9/1992 | Morris | ............ | 60/240 |
| 5,251,852 A | 10/1993 | Pulkowski et al. | ............ | 244/135 |
| 5,263,666 A | 11/1993 | Hubert et al. | ............ | 244/172 |
| 5,651,515 A | 7/1997 | Saccoccia et al. | ............ | 244/158 |
| 5,660,358 A | 8/1997 | Grafwallner et al. | ............ | 244/135 |
| 5,823,478 A | 10/1998 | Dunn | ............ | 244/172 |
| 5,961,074 A | 10/1999 | Dunn | ............ | 244/135 |
| 6,007,022 A * | 12/1999 | Stallard, III | ............ | 244/63 |
| 6,113,032 A | 9/2000 | Cochran et al. | ............ | 244/135 |
| 6,119,985 A | 9/2000 | Clapp et al. | ............ | 244/172 |
| 6,230,734 B1 * | 5/2001 | Grebnev et al. | ............ | 137/220 |
| 6,283,412 B1 | 9/2001 | Mango | ............ | 244/135 |
| 6,631,314 B2 | 10/2003 | Fisher et al. | ............ | 701/13 |
| 6,640,536 B2 * | 11/2003 | Kline et al. | ............ | 60/219 |
| 6,695,256 B2 | 2/2004 | Zeender et al. | ............ | 244/135 |
| 2003/0031806 A1 * | 2/2003 | Jinks | ............ | 427/569 |
| 2003/0136111 A1 * | 7/2003 | Kline et al. | ............ | 60/251 |
| 2004/0231318 A1 * | 11/2004 | Fisher | ............ | 60/258 |

FOREIGN PATENT DOCUMENTS

JP      62045965 A * 2/1987

* cited by examiner

*Primary Examiner*—Tuan C To
(74) *Attorney, Agent, or Firm*—Marsh Fischmann & Breyfogle LLP

(57) ABSTRACT

Propellant management systems and methods are provided for controlling the delivery of liquid propellants in a space launch vehicle utilizing multiple rockets. The propellant management systems and methods may be configured to enable substantial simultaneous depletion of liquid propellants in each of a plurality of active rockets during operation of various booster stages of the launch vehicle.

36 Claims, 21 Drawing Sheets

PROPELLANT MANAGEMENT SYSTEM AND METHOD FOR MULTIPLE BOOSTER ROCKETS

CROSS REFERENCE TO RELATED APPLICATIONS

This application claims priority from U.S. Provisional Application Ser. No. 60/546,524, filed Feb. 20, 2004, and titled "DIFFERENTIAL ENGINE THROTTLING TO MINIMIZE PROPELLANT OUTAGES IN LIQUID STRAP-ON BOOSTERS", and from U.S. Provisional Application Ser. No. 60/557,603, filed Mar. 30, 2004, and titled "DIFFERENTIAL LIQUID ROCKET BOOSTER PROPELLANT MANAGEMENT", each of which are incorporated herein by reference in their entirety.

FIELD OF THE INVENTION

This invention is related to the field of launch vehicles for use in launching a payload from a stationary ground-based position into orbit, and specifically to apparatus, systems and methods for managing propellant usage and delivery in multiple, active rockets.

BACKGROUND OF THE INVENTION

Rocket powered space vehicles used in space missions can generally be categorized into launch vehicles and payloads. Launch vehicles provide the primary thrust for launching and delivering a payload from the Earth's surface into orbit. Launch vehicles generally include one or more rockets arranged to fire at different times, or stages, as the launch vehicle travels from the Earth's surface into orbit. The different stages are fired sequentially, and typically include at least a first stage or booster stage and a second stage. The booster stage is designed to launch and deliver the payload a predetermined distance above the Earth before exhaustion. Upon exhaustion of the booster stage, the second stage is fired to deliver the payload the remainder of the distance into a desired orbit.

Rockets may use either a solid propellant or a liquid propellant. In the case of a liquid propellant system, typical related components include at least one propellant tank, a combustion chamber and a nozzle for accelerating/discharging the combustion product. Liquid propellant rockets generally use a liquid fuel and liquid oxidizer, which are stored in separate propellant tanks and brought into contact in the combustion chamber of an engine to provide thrust. Such liquid propellant rocket systems have gained favor for many space applications because of their performance, economics, safety, fluttering capabilities and inherent flexible missions designs.

For a booster stage that uses only a single liquid propellant rocket, it is known to actively monitor propellant levels in the two propellant tanks (the fuel and oxidizer being the two "propellants"), and to dynamically adjust the flow of the propellants such that they are depleted at virtually the same time. This maximizes the amount of propellant burned prior to engine shutdown and jettison of the rocket. Such apparatus, methods and systems have been disclosed in commonly owned U.S. patent application Ser. No. 10/052,126, filed Jan. 17, 2002 titled "PROPELLANT UTILIZATION SYSTEM", now U.S. Pat. No. 6,631,314, the contents of which are incorporated herein by reference in their entirety.

Simultaneously depleting liquid propellants becomes more complicated when the booster stage comprises more than one rocket. In a multi-rocket system, each of the rockets has a potential to run out of liquid propellant at different times even though the ratio of fuel and oxidizer may be identical. This is primarily due to the rockets burning propellant at different rates. While each rocket is designed and calibrated to burn a specified amount of propellant each second, there can be noticeable variations due to actual operating conditions, acceptance test inaccuracies and other unforeseen occurrences. As a consequence, there exists a risk that the rockets will not run out of propellant at the same time. This is disadvantageous because once one of the rockets has gone below a threshold propellant level, the flight computer will shut down all similar stage rockets and jettison them even though propellant remains in the other rockets. Thus, the first rocket to fall below the predetermined specified threshold will have burned essentially all of its available propellant, but the other remaining rockets will have more than the threshold level of propellant remaining. The unused propellant ends up being "dead weight" that was carried aloft unnecessarily by the launch vehicle, affecting the lift capability of the system.

SUMMARY OF THE INVENTION

The present invention generally relates to a system and method for managing the propellant used by a space vehicle having multiple liquid propellant rockets or boosters. More specifically, the present invention relates to a system and method for managing the propellant used by multiple, strap-on, liquid propellant boosters of a launch vehicle (e.g., a heavy lift launch vehicle).

A first aspect of the present invention is embodied by a launch vehicle having a plurality of rockets. Each rocket includes a tank having a propellant constituent, a tank sensor that is at least operatively interconnected with this tank, and a throttle valve or throttle regulator valve that is fluidly interconnected with this tank and that controls the thrust of the rocket. The launch vehicle further includes what may be characterized as propellant logic and differential propellant logic. The propellant logic is operatively interconnected with the tank sensor of at least two of the rockets (preferably with the tank sensor of each rocket) and is configured to calculate an amount of the propellant constituent in the tank of at least two of the rockets on at least some basis. The differential propellant logic is operatively interconnected with the propellant logic and a throttle valve of at least two of the rockets. The differential propellant logic is configured to calculate a difference that may exist in the amount of propellant constituent remaining between at least two of the rockets (e.g., to determine a difference between the amount of propellant constituent of a first rocket and the amount of this same propellant constituent of a second rocket), and further is configured to send a first signal to the throttle valve of at least one of the rockets to account for the existence of this difference.

Various refinements exist of the features noted in relation to the first aspect of the present invention. Further features may also be incorporated in the first aspect of the present invention as well. These refinements and additional features may exist individually or in any combination. Typically the rocket that is running faster (having the lesser amount of the propellant constituent(s) being compared) will be "throttled down." However, the differential propellant logic could send the first signal to the throttle valve of a rocket that is running slower (having a larger amount of the propellant constituent(s) being compared), so as to "increase the throttle" of this rocket.

The launch vehicle and rockets each may be of any appropriate configuration. In one embodiment, the rockets are liquid propellant strap-on boosters that are simultaneously shut down at the appropriate time, and thereafter simultaneously jettisoned from the launch vehicle. The first aspect may be characterized as a launch vehicle that attempts to minimize the amount of propellant remaining in the rockets before they are shut down and jettisoned from the launch vehicle. Although it would, of course, be preferable for the propellant to be completely depleted in each of the various rockets at the time of shut down for jettisoning from the launch vehicle, more likely a small amount of propellant will remain in one or more of the rockets at the time of the shut down.

The propellant logic may calculate the amount of the propellant constituent of a particular rocket in any appropriate manner. In one embodiment, the mass of propellant constituent in a given tank is calculated by measuring the pressure at the bottom of its corresponding tank, and taking into account the density of the propellant constituent and the acceleration level of the volume of the propellant constituent within the tank. In some cases, an axial acceleration imbalance may exist between two or more rockets due to the existence of an angular acceleration. In this regard, the launch vehicle may include axial acceleration logic that adjusts the acceleration level that is used to convert a pressure head to a propellant mass to enhance the accuracy of the mass determination. Generally, the axial acceleration logic may estimate/calculate an axial acceleration that is the product of the angular acceleration (e.g., computable by numerically differentiating multiple rate gyro signals) and a moment arm coinciding with the distance between the longitudinal centerlines of a pair of rockets.

Both the propellant logic and the differential propellant logic, as well as the above-noted axial acceleration logic, may be of any appropriate form/configuration, and may be implemented in any appropriate manner. What is of primary importance is for the launch vehicle to somehow incorporate the noted functionalities. The propellant constituent that is "monitored" for purposes of the differential propellant logic may be any appropriate oxidizer or fuel. For instance, the differential propellant logic could compare the amount of oxidizer remaining in relation to two or more rockets, or the differential propellant logic could compare the amount of fuel remaining in relation to two or more rockets. It also may be possible for the differential propellant logic to receive information on the amount of multiple propellant constituents (e.g., the amount of fuel and the amount of oxidizer) for each of two or more rockets, all for purposes of controlling the operation of one or more throttle valves.

The launch vehicle may include a total flow rate logic that may be of any appropriate form/configuration and that may be implemented in any appropriate manner. A common total flow rate logic could be utilized by two or more rockets. A separate total flow rate logic could be provided for two or more rockets as well. In any case, the total flow rate logic is operatively interconnected with the propellant logic and the throttle valve of two or more of the rockets of the launch vehicle, and preferably with the throttle valve of each rocket. Regardless of how the total flow rate logic is configured or implemented, it considers each rocket separately for purposes of controlling its respective throttle valve. In this regard, the total flow rate logic is configured to calculate a difference between a theoretical total propellant flow rate (e.g., a pre-programmed throttle profile for the rocket) and an actual total propellant flow rate associated with a particular rocket (e.g., computed by numerically differentiating the sensed/calculated mass of the propellant). Preferably, the total flow rate logic provides this functionality in relation to each rocket. In any case, the total flow rate logic is configured to control the operation of a throttle valve of a particular rocket if the difference between its theoretical and actual total propellant flow rates differs by more than a predetermined amount. The total flow rate logic could consider a single propellant constituent of a particular rocket, but more preferably considers each propellant constituent.

Two or more rockets of the launch vehicle each may include a first tank with a first propellant constituent, a second tank with a second propellant constituent, and first and second tank sensors of any appropriate type. The throttle valve of each rocket is fluidly interconnected with its corresponding first and second tanks. The propellant logic may be operatively interconnected with the first and second tank sensors of at least two of the rockets. For instance, each rocket may include a first mixture ratio valve that is fluidly interconnected with at least one of the corresponding first and second tanks. The first mixture ratio valve may at least contribute to controlling the mixture of the first and second propellant constituents provided to, for instance, a combustion chamber of the rocket. In any case, the launch vehicle may also include mixture ratio logic that is operatively interconnected with the propellant logic and the first mixture ratio valve of two or more rockets.

The mixture ratio logic may be of any appropriate configuration and implemented in any appropriate manner. A common mixture ratio logic could be utilized by two or more rockets. A separate mixture ratio logic could be provided for each of two or more rockets as well. In any case, the mixture ratio logic is operatively interconnected with the propellant logic and the first mixture ratio valve of two or more of the rockets of the launch vehicle. Regardless of how the mixture ratio logic is configured or implemented, it considers each rocket separately for purposes of controlling its first mixture ratio valve. In this regard, the mixture ratio logic operatively interfaces with the first mixture ratio valve of a particular rocket such that its first and second propellant constituents are at least substantially simultaneously depleted. This would include having no more than a certain, preferably minimal amount of first and second propellant constituents remain at the time that the rocket is shut down for jettisoning. Preferably, the mixture ratio rate logic provides the described functionality in relation to each rocket of the launch vehicle. In one embodiment, the launch vehicle utilizes both the mixture ratio logic and the above-discussed total flow rate logic.

The differential propellant logic and the total flow rate logic may be characterized as generating an appropriate error signal. Any such error signal may be provided to the relevant throttle valve in any appropriate manner. In one embodiment, each such error signal is sent to an appropriate controller, such as a proportional and integral control algorithm. Such a controller could consider the error signals from the differential propellant logic and the total flow rate logic separately or in combination.

A second aspect of the present invention is embodied by a launch vehicle having a plurality of liquid propellant, strap-on boosters (hereafter first and second boosters). Each booster includes first and second tanks containing first and second propellant constituents, respectively (e.g., an appropriate oxidizer and fuel). A throttle regulator valve is fluidly interconnected with the first and second tanks, and controls the thrust of the booster. The differential propellant logic is operatively interconnected with the throttle regulator valve of the first and second boosters. Generally, the differential propellant logic outputs a first differential propellant control signal to the throttle regulator valve of the first booster based at least in part upon the existence of a difference in the amount of the first propellant constituent in the first and second boosters (e.g., if the amount of the first propellant constituent in the first booster differs from the amount of the first propellant constituent in the second booster).

Various refinements exist of the features noted in relation to the second aspect of the present invention. Further features may also be incorporated in the second aspect of the present invention as well. These refinements and additional features may exist individually or in any combination. Typically the differential propellant logic will send the first differential propellant control signal to the booster that is running faster (having the lesser amount of the propellant constituent(s) being compared), so as to "throttle down" this booster. However, the differential propellant logic could send the first differential propellant control signal to the throttle valve of a booster that is running slower (having a larger amount of the propellant constituent(s) being compared), so as to "increase the throttle" of this booster.

The launch vehicle and boosters each may be of any appropriate configuration. In one embodiment, the boosters are simultaneously shut down at the appropriate time and thereafter simultaneously jettisoned from the launch vehicle. The second aspect may be characterized as minimizing the amount of propellant remaining in the boosters when they are shut down and jettisoned from the launch vehicle. Although it would of course be preferable for the propellant to be completely depleted in each of the boosters at the time of shut down, more typically a certain amount of propellant will remain in one or more of the boosters at the time of the shut down.

Each booster may include one or more components that determine the amount (e.g., mass) of the first propellant constituent in its first tank, and this information may be provided to the differential propellant logic. The remaining amount of the first propellant constituent in a particular booster may be determined in any appropriate manner. In one embodiment, the mass of the first propellant constituent in the first tank of a particular booster is calculated by measuring the pressure at the bottom of this first tank, and taking into account the density of the first propellant constituent and the acceleration level of the volume of the first propellant constituent within this first tank. In some cases, an axial acceleration imbalance may exist between the first and second boosters due to the existence of an angular acceleration. In this regard, the launch vehicle may include axial acceleration logic that adjusts the acceleration level that is used to convert a pressure head to a propellant mass to enhance the accuracy of the mass determination. Generally, the axial acceleration logic may estimate/calculate an axial acceleration that is the product of the angular acceleration (e.g., computable by numerically differentiating multiple rate gyro signals) and a moment arm coinciding with the distance between the longitudinal centerlines of the first and second boosters.

The launch vehicle may include a total flow rate logic that may be of any appropriate configuration and implemented in any appropriate manner. In one embodiment, a first total flow rate logic is operatively interconnected with the throttle regulator valve of the first booster, and a second total flow rate logic is operatively interconnected with throttle regulator valve of the second booster. The first total flow rate logic outputs a first total flow rate control signal to the throttle regulator valve of the first booster that is based upon a difference between a theoretical total propellant flow rate associated with the first booster (e.g., a pre-programmed throttle profile for the first booster) and an actual total propellant flow rate associated with the first booster (e.g., computed by numerically differentiating the sensed/calculated mass of the propellant). The second total flow rate logic outputs a second total flow rate control signal to the throttle regulator valve of the second booster that is based upon a difference between a theoretical total propellant flow rate associated with the second booster (e.g., a pre-programmed throttle profile for the second booster) and an actual total propellant flow rate associated with the second booster (e.g., computed by numerically differentiating the sensed/calculated mass of the propellant). Both the first and second total flow rate logic could consider a single propellant constituent of a particular booster, but more preferably consider each propellant constituent used by the booster.

Each booster may include a first mixture ratio valve that is fluidly interconnected with at least one of the corresponding first and second tanks. The first mixture ratio valve may at least contribute to controlling the mixture of the first and second propellant constituents provided to, for instance, a combustion chamber of the booster. In any case, the launch vehicle may also include mixture ratio logic that is operatively interconnected with the first mixture ratio valve of at least the first and second boosters.

The mixture ratio logic may be of any appropriate configuration and implemented in any appropriate manner. A common mixture ratio logic could be utilized for the first and second boosters. A separate mixture ratio logic also could be provided for the first and second boosters. In any case, the mixture ratio logic is operatively interconnected with the first mixture ratio valve of at least the first and second boosters, and including the first mixture ratio valve of each booster used by the launch vehicle. Regardless of how the mixture ratio logic is configured or implemented, it considers each booster separately for purposes of controlling its first mixture ratio valve. In this regard, the mixture ratio logic operatively interfaces with the first mixture ratio valve of a particular booster such that its first and second propellant constituents are at least substantially simultaneously depleted. This would include having no more than a certain amount, and preferably a minimal amount, of first and second propellant constituents remain at the time that the booster is shut down. Preferably, the mixture ratio rate logic provides this functionality in relation to each booster used by the launch vehicle. In one embodiment, the launch vehicle utilizes both the mixture ratio logic and the above-discussed total flow rate logic.

The differential propellant logic and the total flow rate logic may be characterized as generating an appropriate error signal. Any such error signal may be provided to the relevant throttle valve in any appropriate manner. In one embodiment, each such error signal is sent to an appropriate controller, such as a simple proportional and integral control algorithm. Such a controller could consider the error signals from the differential propellant logic and the total flow rate logic separately or in combination.

A third aspect of the present invention is embodied by a method of controlling of a delivery or the flow of at least a first propellant constituent in each of first and second liquid propellant, strap-on boosters of a launch vehicle. An amount of the first propellant constituent (e.g., an appropriate oxidizer or fuel) in the first booster is compared with an amount of the first propellant constituent in the second booster. The operation of a first throttle regulator valve of the first booster is controlled based at least in part upon this comparison. The first throttle regulator valve affects the thrust provided by the first booster.

Various refinements exist of the features noted in relation to the third aspect of the present invention. Further features may also be incorporated in the third aspect of the present invention as well. These refinements and additional features may exist individually or in any combination. A determination may be made as to the amount (e.g., mass) of the first propellant constituent in each of the first and second boosters. This determination may be made in any appropriate manner. In one embodiment, the mass of the first propellant constituent in a tank of the relevant booster is calculated by measuring the pressure at the bottom of this tank, and taking into account the density of the first propellant constituent and the acceleration level of the volume of the first propellant constituent within this tank. In some cases, an axial acceleration imbalance may exist between the first and second boosters due to the existence of an angular acceleration. In this regard, the acceleration level that is used to convert a pressure head to a propellant mass may be adjusted by an estimation of an axial acceleration term. This axial acceleration term is the product of the angular acceleration (e.g., computable by numerically differentiating multiple rate gyro signals) and a moment arm coinciding with the distance between the longitudinal centerlines of the first and second boosters.

The operation of the first and second boosters may be simultaneously terminated. The first propellant constituent in each of the first and second boosters is preferably at least substantially depleted at the same time (e.g., no more than a certain, preferably nominal, amount of the first propellant constituent remains in either the first or second booster). The first and second boosters may then be simultaneously jettisoned from the launch vehicle.

The operational control of the first throttle regulator valve of the first booster also may be based upon an evaluation of a total propellant flow rate associated with the first booster. A comparison of a difference between a theoretical total propellant flow rate associated with the first booster (e.g., a pre-programmed throttle profile for the first booster) and an actual total propellant flow rate associated with the first booster (e.g., computed by numerically differentiating the sensed/calculated mass of the propellant) may be made, and thereafter used to control the operation of the first throttle regulator valve. The comparison of the theoretical and actual total flow rates could be based upon a single propellant constituent of a particular booster, but more preferably considers each propellant constituent used by the booster.

A second throttle regulator valve associated with the second booster may be controlled in the same manner as the first throttle regulator valve of the first booster. Typically a control signal will be sent the booster that is running faster (having the lesser amount of the propellant constituent(s) being compared), so as to "throttle down" this booster. However, a control signal could be sent to the throttle valve of a booster that is running slower (having a larger amount of the propellant constituent(s) being compared), so as to "increase the throttle" of this booster.

The first and second boosters each may further utilize a second propellant constituent. For instance, the first propellant constituent could be an appropriate oxidizer and the second propellant constituent could be an appropriate fuel, or vice versa. Each of the first and second boosters may include a first mixture ratio valve that is fluidly interconnected with a flow of at least one of the first and second propellant constituents. The first mixture ratio valve may at least contribute to controlling the mixture of the first and second propellant constituents provided to, for instance, a combustion chamber of the corresponding booster. In any case and separately for each of the first and second boosters, the amount of the first propellant constituent is compared with the amount of the second propellant constituent, and the corresponding first mixture ratio valve is operated so that the first and second propellant constituents are at least substantially simultaneously depleted, or such that at least substantially the same amount of the first and second propellant constituents exists upon termination of the operation of the booster.

Whether comparing the amount of a certain propellant constituent between two or more boosters, or comparing the total flow rate of propellant for an individual booster in relation to a theoretical total flow rate for this booster, the comparison may generate an appropriate error signal. Any such error signal may be provided to the relevant throttle regulator valve in any appropriate manner. In one embodiment, each such error signal is sent to an appropriate controller, such as a simple proportional and integral control algorithm. Such a controller could consider the error signals from different comparisons separately or in combination.

A fourth aspect of the present invention is embodied by a method for controlling the operation of a launch vehicle. The method includes monitoring the amount of a first propellant constituent in the first tank associated with the first rocket or booster, monitoring the amount of a second propellant constituent in the second tank associated with the first rocket, and adjusting the operation of the least one of the first and second rockets such that the first propellant constituent of the first rocket and the second propellant constituent of the second rocket are at least substantially depleted at least substantially at the same time.

Various refinements exist of the features noted in relation to the fourth aspect of the present invention. Further features may also be incorporated in the fourth aspect of the present invention as well. These refinements and additional features may exist individually or in any combination. The first and second compound constituents may be of the same type. In one embodiment, the first and second propellant constituents are each an appropriate oxidizer. In another embodiment, the first and second propellant constituents are each an appropriate fuel. In any case, the operation of the first and second rockets may be simultaneously terminated, and thereafter the first and second rockets may be simultaneously jettisoned from the launch vehicle.

The difference between the amount of the first propellant constituent associated with the first rocket and the amount of the second propellant constituent associated with the second rocket may be calculated in any appropriate manner, and the adjustment of the operation of at least one of the first and second rockets may be based at least in part upon this calculation. The amount of the first propellant constituent in the first booster may be determined in any appropriate manner. In one embodiment, the mass of the first propellant constituent is calculated by measuring the pressure at the bottom of a tank containing this first propellant constituent, and taking into account the density of the first propellant constituent and the acceleration level of the volume of the first propellant constituent within this tank. In some cases, an axial acceleration imbalance may exist between the first and second boosters due to the existence of an angular acceleration. In this regard, the acceleration level that is used to convert a pressure head to a propellant mass may be adjusted to enhance the accuracy of the mass determination. Generally, an axial acceleration may be calculated by taking the product of the angular acceleration (e.g., computable by numerically differentiating multiple rate gyro signals) and a moment arm coinciding with the distance between the longitudinal centerlines of the first and second rockets. The amount of second propellant constituent for the second booster may be determined in the same manner as discussed above in relation to the first propellant constituent.

Typically the operation of the rocket that is running faster (having the lesser amount of the propellant constituent(s) being compared) will be adjusted so as to "throttle down" this booster. However, the operation of a booster that is running slower (having a larger amount of the propellant constituent(s) being compared) instead may be adjusted so as to "throttle up" this booster.

A fifth aspect of the present invention is directed to controlling the operation of at least one throttle regulator valve of a rocket or liquid propellant strap-on booster used by a launch vehicle. A comparison of a difference between a theoretical total propellant flow rate associated with a first booster (e.g., a pre-programmed throttle profile for the first booster) and an actual total propellant flow rate associated with the first booster (e.g., computed by numerically differentiating the sensed/calculated mass of the propellant) may be made, and thereafter used to control the operation of the first throttle regulator valve. The throttle regulator valve of multiple boosters may be controlled in the manner described in relation to this fifth aspect. The discussion presented above with regard to total flow rate logic or total flow rate control may be used by this fifth aspect.

A sixth aspect of the present invention relates to determining the amount of a first propellant constituent that is contained with a first tank. A space vehicle includes at least first and second rockets or strap-on boosters, each having a first tank with the first propellant constituent contained therein. Although the amount determination may be made in any appropriate manner, the determination should account for an angular acceleration of the space vehicle during flight. In one embodiment, the mass of the first propellant constituent in the first tank is calculated by measuring the pressure at the bottom of the first tank, and taking into account the density of the first propellant constituent and the acceleration level of the volume of the first propellant constituent within the first tank. In some cases, an axial acceleration imbalance may exist between the first and second rockets due to the existence of an angular acceleration. In this regard, the acceleration level that is used to convert a pressure head to a propellant mass may be adjusted by an estimation of an axial acceleration term. This axial acceleration term is the product of the angular acceleration (e.g., computable by numerically differentiating multiple rate gyro signals) and a moment arm coinciding with the distance between the longitudinal centerlines of the first and second rockets.

The various comparisons discussed above in relation to the first through the sixth aspects may be taken on any spatial basis (e.g., periodically, or at a certain frequency). It may be desirable to start these comparisons after the passage of a certain amount of time after the initial lift off of the launch vehicle. However, it is within the scope of the present invention to start the comparisons and start making the desired operational adjustment(s) at any appropriate time. Preferably, once the comparisons are initiated, they are repeated on some basis throughout the remainder of the flight, making the desired operational adjustment when so justified by the relevant comparison.

Each of the above-noted aspects may be used individually or in any combination. For instance, the third or fourth aspect may be used in combination with the fifth aspect, the sixth aspect or both. Moreover, the fifth and sixth aspects may be used in combination. In addition, the fifth and sixth aspects may use each of the features discussed in relation to the first through the fourth aspects, individually or in any combination.

BRIEF DESCRIPTION OF THE DRAWINGS

FIG. 5a-1 illustrates one embodiment of a launch vehicle that uses a differential propellant logic.

FIG. 5a-2 illustrates one basic operation sequence of the launch vehicle depicted in FIG. 5a-1.

FIG. 5b-1 illustrates one embodiment of a launch vehicle that uses a total flow rate logic.

FIG. 5b-2 illustrates one basic operation sequence of the launch vehicle depicted in FIG. 5b-1.

FIG. 5c-1 illustrates one embodiment of a launch vehicle that uses both a differential propellant logic and a total flow rate logic.

FIG. 5c-2 illustrates one basic operation sequence of the launch vehicle depicted in FIG. 5c-1.

FIG. 5c-3 illustrates a further operation sequence of the launch vehicle depicted in FIG. 5c-1.

FIG. 5d-1 illustrates one embodiment of a launch vehicle that uses a mixture ratio logic, a differential propellant logic, and a total flow rate logic.

FIG. 5d-2 illustrates one basic operation sequence of the launch vehicle depicted in FIG. 5d-1.

FIG. 5e-1 illustrates one embodiment of a launch vehicle that uses both a mixture ratio logic and a differential propellant logic.

FIG. 5e-2 illustrates one basic operation sequence of the launch vehicle depicted in FIG. 5e-1.

FIG. 5f-1 illustrates one embodiment of a launch vehicle that uses both a mixture ratio logic and a total flow rate logic.

FIG. 5f-2 illustrates one basic operation sequence of the launch vehicle depicted in FIG. 5f-1.

FIG. 5g-1 illustrates one embodiment of a launch vehicle that uses an axial acceleration logic, a mixture ratio logic, a differential propellant logic, and a total flow rate logic.

FIG. 5g-2 illustrates one basic operation sequence of the launch vehicle depicted in FIG. 5g-1.

FIG. 5g-3 illustrates a further basic operation sequence of the launch vehicle depicted in FIG. 5g-1.

DETAILED DESCRIPTION OF THE INVENTION

Figure 1:
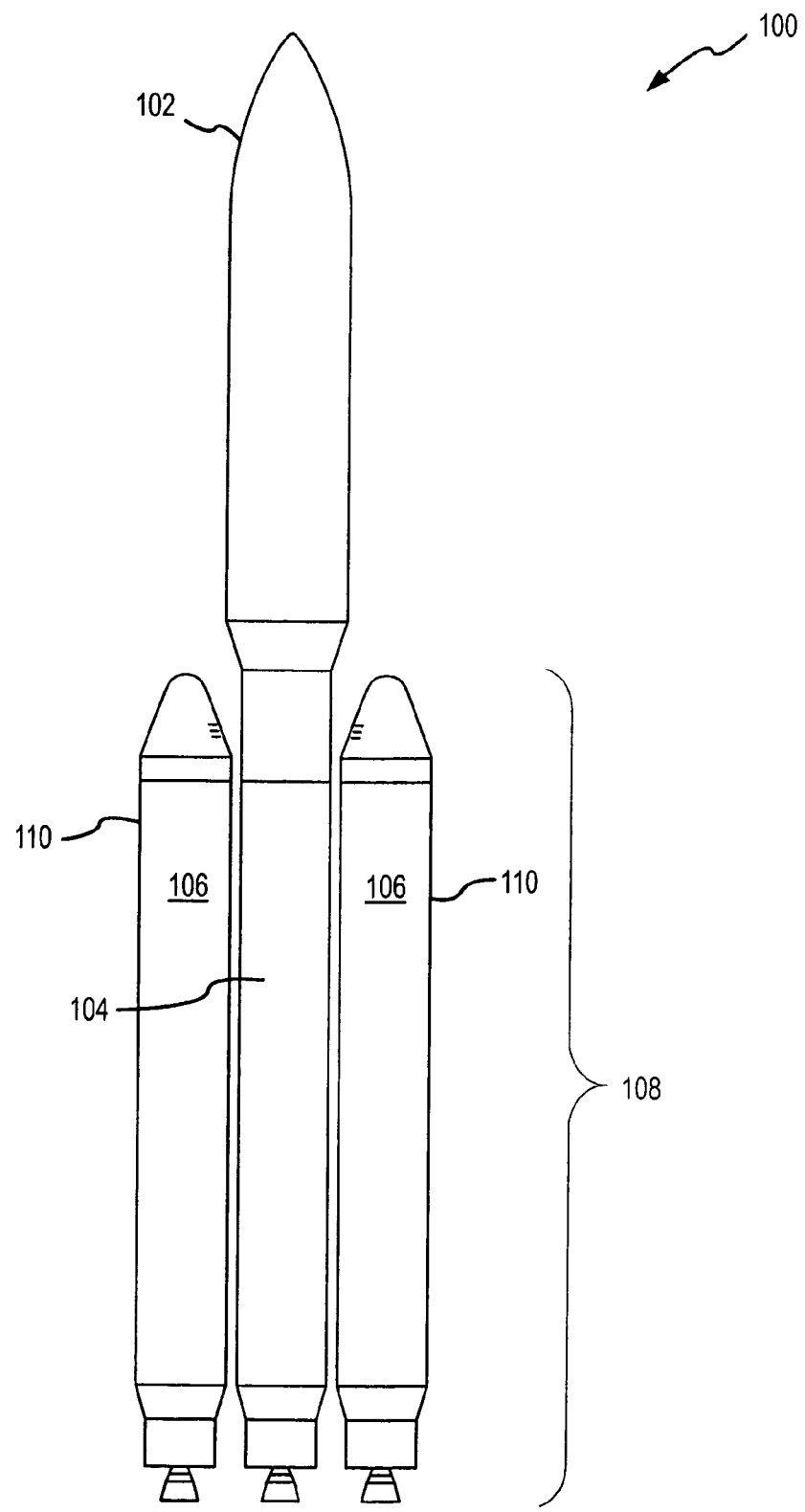
FIG. 1 illustrates one embodiment of a space vehicle having a payload and a launch vehicle.

Reference will now be made to the accompanying drawings, which at least assist in illustrating the various pertinent features of the present invention. FIG. 1 illustrates one embodiment of a space vehicle 100. The space vehicle 100 generally includes a payload 102 and a launch vehicle 108, which comprises a first thrust source 110 and a second thrust source 104. As depicted, the space vehicle 100 comprises one rocket for the second thrust source 104. It will also be appreciated that any appropriate number of rockets could be used by the second thrust source 104. Also as depicted, the first thrust source 110 comprises two liquid propellant strap-on rockets or boosters 106. It should be appreciated that any appropriate number of liquid propellant rockets 106 may be utilized by the space vehicle 100. For instance, the first thrust source 110 could comprise more than two liquid propellant rockets 106, such as 3, 4, 5, 6, 7, 8 or more rockets 106.

Various ways of controlling the operation of the various liquid booster rockets 106 are described below. For instance, a differential propellant logic may be employed such that the propellant in each of the various liquid booster rockets 106 used by the second thrust source 110 will be at least substantially depleted when all of the liquid booster rockets 106 are simultaneously shut down and thereafter jettisoned from the launch vehicle 108. A total flow rate control logic also may be employed such that the actual thrust being provided by a particular liquid booster rocket 106 is more in accordance with the desired value. Each of these logics may of course be used in tandem.

Figure 2:
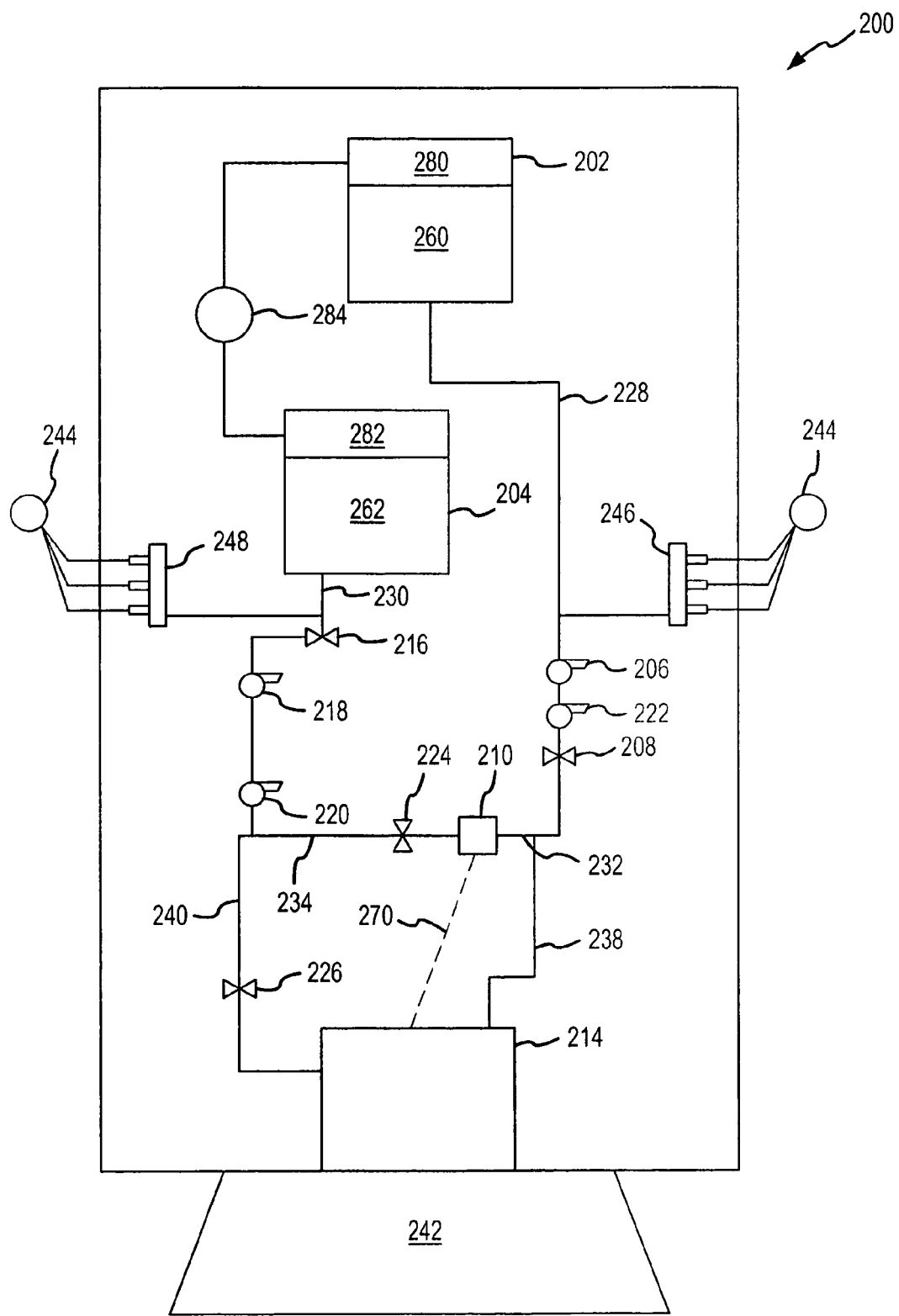
FIG. 2 illustrates one embodiment of a liquid propellant strap-on booster rocket that may be used by the launch vehicle in FIG. 1.

FIG. 2 is a block diagram of a representative configuration of a liquid propellant rocket or liquid booster rocket 200 that may be utilized by the liquid booster rockets 106 of the launch vehicle 108 of FIG. 1. Other configurations may be appropriate as well. The liquid propellant rocket 200 generally comprises two propellant tanks 202, 204 fluidly connected to a combustion chamber 214 by a series of feed lines, pumps and valves, as described in further detail below. Propellant tank 202 generally comprises a first propellant constituent 260, while propellant tank 204 generally comprises a second propellant constituent 262. The liquid propellant constituents 260, 262 are useful in creating the exothermic reaction that helps to propel the launch vehicle 108 into orbit. Generally, one of the propellant constituents 260, 262 is an appropriate oxidizing propellant constituent (e.g., liquid oxygen), and the other of the propellant constituents 260, 262 is an appropriate rocket fuel (e.g., an appropriate hydrocarbon based fuel).

The first propellant constituent 260 (e.g., liquid oxygen), is fluidly connected to the combustion chamber 214 via the first propellant feed line 228, through pumps 206, 222, a first propellant inlet valve 208 and a first propellant combustion chamber feed line 238. The second propellant constituent 262, (e.g., kerosene rocket fuel) is fluidly connected to the combustion chamber 214 via the second propellant feed line 230, through a second propellant inlet valve 216, pumps 218, 220, and a second propellant combustion chamber feed line 240, which comprises a mixture ratio valve 226 disposed downstream of pump 220 and upstream of combustion chamber 214. In one approach, a second mixture ratio valve (not shown) may also be disposed in first propellant combustion chamber feed line 238, downstream of pump 208 and upstream of combustion chamber 214.

In operation, the first and second propellant constituents 260, 262 are delivered through the pumps 206, 218, 220, 222 and valves 208, 216, 226 to the combustion chamber 214 where an exothermic reaction occurs, creating force and energy that is expelled through nozzle 242 to propel the launch vehicle 108. As is discussed in more detail below, mixture ratio valve(s) (e.g., valve 226) may be operably connected to a mixture ratio logic (not shown) to control the depletion of one or more of the propellant constituents 260, 262.

The first propellant constituent 260 may also be fluidly connected to a precombustion zone 210 via the first propellant feed line 228, through pumps 206, 222, a first propellant inlet valve 208 and a first propellant precombustion zone feed line 232. The second propellant constituent 262 may also be fluidly connected to precombustion zone 210 via the second propellant feed line 230, through the second propellant inlet valve 216, pumps 218, 220 and second propellant precombustion zone feed line 234, which comprises a throttle valve 224 disposed downstream of pump 220 and upstream of precombustion zone 210. The precombustion zone 210 generally comprises a turbine (not shown) and bellows 270 fluidly connected to the combustion chamber 214, as described below.

In operation, a portion of the first and second propellant constituents 260, 262 are supplied to and combusted in precombustion zone 210. Throttle valve 224 is operably connected to total flow rate logic (not shown) and/or differential propellant logic (not shown) and controls the amount of second propellant constituent 262 supplied to the precombustion zone 210, as is described in further detail below. Generally, the throttle valve 224 controls the amount of thrust or the overboard propellant flow rate being provided/generated by the liquid booster rocket 200 in a manner known in the art. However, it is not known to control the throttle valve 224 using a total flow rate logic (not shown) and/or differential propellant logic (not shown), as is described in more detail below.

Tank sensors 246, 248 may be operably connected to each of the propellant tanks 202, 204 and a propellant logic 244. This propellant logic 244 may include or at least be operatively interconnected with any of the above-noted total flow rate logic, differential propellant logic, and/or mixture ratio logic, as is discussed in more detail below. Each tank sensor 246, 248 may be adapted to measure a first measurement parameter associated with their respective propellant tanks 202,204. For example, the tanks sensors 246, 248 may be adapted to continuously or intermittently measure the pressure head in each of the propellant tanks 202, 204 and their respective feed lines 228, 230. Such pressure measurements can be utilized to calculate the remaining liquid mass in each of the propellant tanks 202, 204 using well-known principles, as is described in commonly-owned U.S. patent application Ser. No. 10/057,224 filed Jan. 25, 2002 titled "CRYOGENIC PROPELLANT DEPLETION SYSTEM FOR A LAUNCH VEHICLE", now U.S. Pat. No. 6,695,256, the contents of which are incorporated herein by reference in their entirety. As is discussed in more detail below, propellant logic 244 uses the measurements periodically supplied by the tank sensors 246, 248 to calculate the remaining liquid mass in each of the propellant tanks 202, 204 and may send information relating thereto to the total flow rate logic, differential propellant logic, and/or mixture ratio logic (not shown).

Feed lines 228, 230 are located generally on the bottom of their propellant tanks 202, 204. During ascent of the launch vehicle 108, forces due to gravity and acceleration direct the first and second propellant constituents 260, 262 into their feed lines 228, 230 to supply their pumps 206, 218, 220, 222, which force the propellant constituents 260, 262 into contact in the combustion chamber 214. In addition to utilizing gravity and acceleration to expel the propellant constituents 260, 262 from the tanks 202, 204, many systems use a high pressure gas in the ullage space 280, 282 of the respective tanks 202, 204 to force the propellants constituents 260, 262 into their respective feed lines 228, 230. Typically, helium is used due to its low molecular weight and chemically inert properties, although other gases may be utilized. A separate ullage gas supply system may be utilized in which a stored supply 284 of the ullage gas is introduced into the ullage spaces 280, 282 to maintain a desired pressure above the liquid propellant constituents 260, 262.

Figure 3:
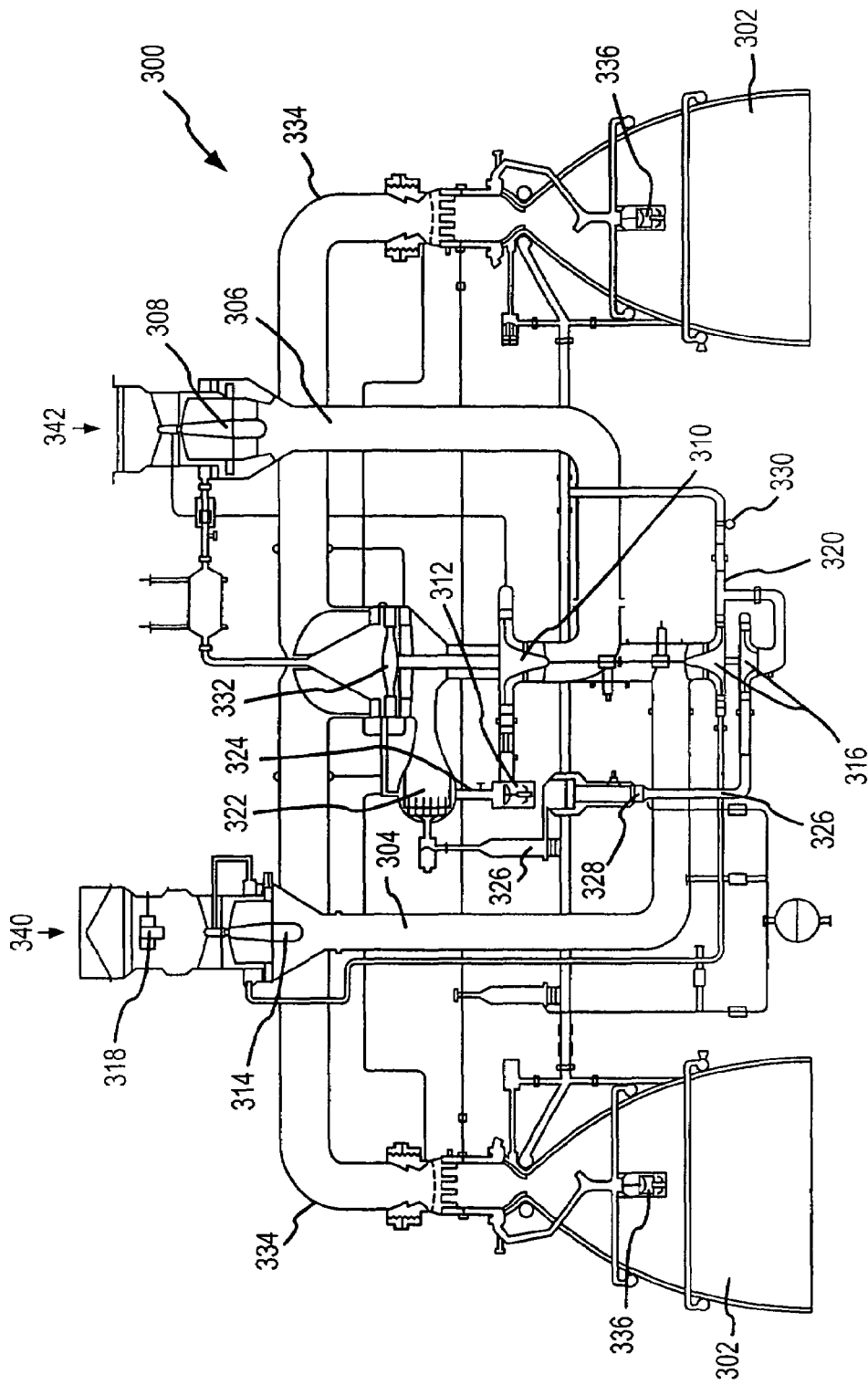
FIG. 3 illustrates one embodiment of a liquid propellant rocket engine that may be used by the liquid booster strap-on rocket of FIG. 2.

FIG. 3 depicts one embodiment of a representative engine that may be used by the liquid propellant rocket 200 of FIG. 2. The engine 300 comprises two combustion chambers 302 fluidly connected to the propellant constituents and tanks (not shown) via inlets 340, 342 and feed lines 304, 306. A first propellant constituent, such as liquid oxygen, is supplied to the combustion chambers 302 (e.g., via inlet 342, through first propellant feed line 306, pumps 308, 310, inlet valve 312). A second propellant constituent, such as kerosene rocket fuel, is supplied to the combustion chambers 302 via inlet 340, through second propellant feed line 304, inlet valve 318, pumps 314, 316 and second propellant combustion chamber feed line 320. A mixture ratio valve 330 may be disposed within the second propellant combustion chamber feed line 320, downstream of pump 316 and upstream of combustion chambers 302. The mixture ratio valve 330 may be operably connected to mixture ratio logic (not shown), as is discussed in more detail below. The combustion chambers 302 generally also comprise a second propellant main outlet valve 336.

The first propellant constituent is also fluidly connected to a precombustion zone 322 via inlet 342, through first propellant feed line 306, pumps 308, 310, inlet valve 312 and first propellant precombustion zone feed line 324. The second propellant constituent is fluidly connected to the precombustion zone 322 via inlet 340, through second propellant feed line 304, pumps 314, 316 and second propellant precombustion zone feed line 326. A throttle valve 328 is disposed within the second propellant precombustion zone feed line 326, downstream of pump 316 and upstream of precombustion zone 322. The throttle valve 328 may be operably connected to total flow rate logic and/or differential logic (not shown), as is discussed in more detail below. The precombustion chamber 322 is generally fluidly connected to the combustion chambers 302 via a turbine 332 and bellows 334.

In current launch vehicles comprising a single liquid propellant rocket, the throttle valve 328 is controlled using a pre-programmed profile tailored to the specific mission, which keeps the launch vehicle within the pre-programmed dynamic environmental constraints. A separate closed-loop control system may also be employed to control the throttle valve 328 such that the rocket does not exceed a maximum axial acceleration limitation.

Figure 4:
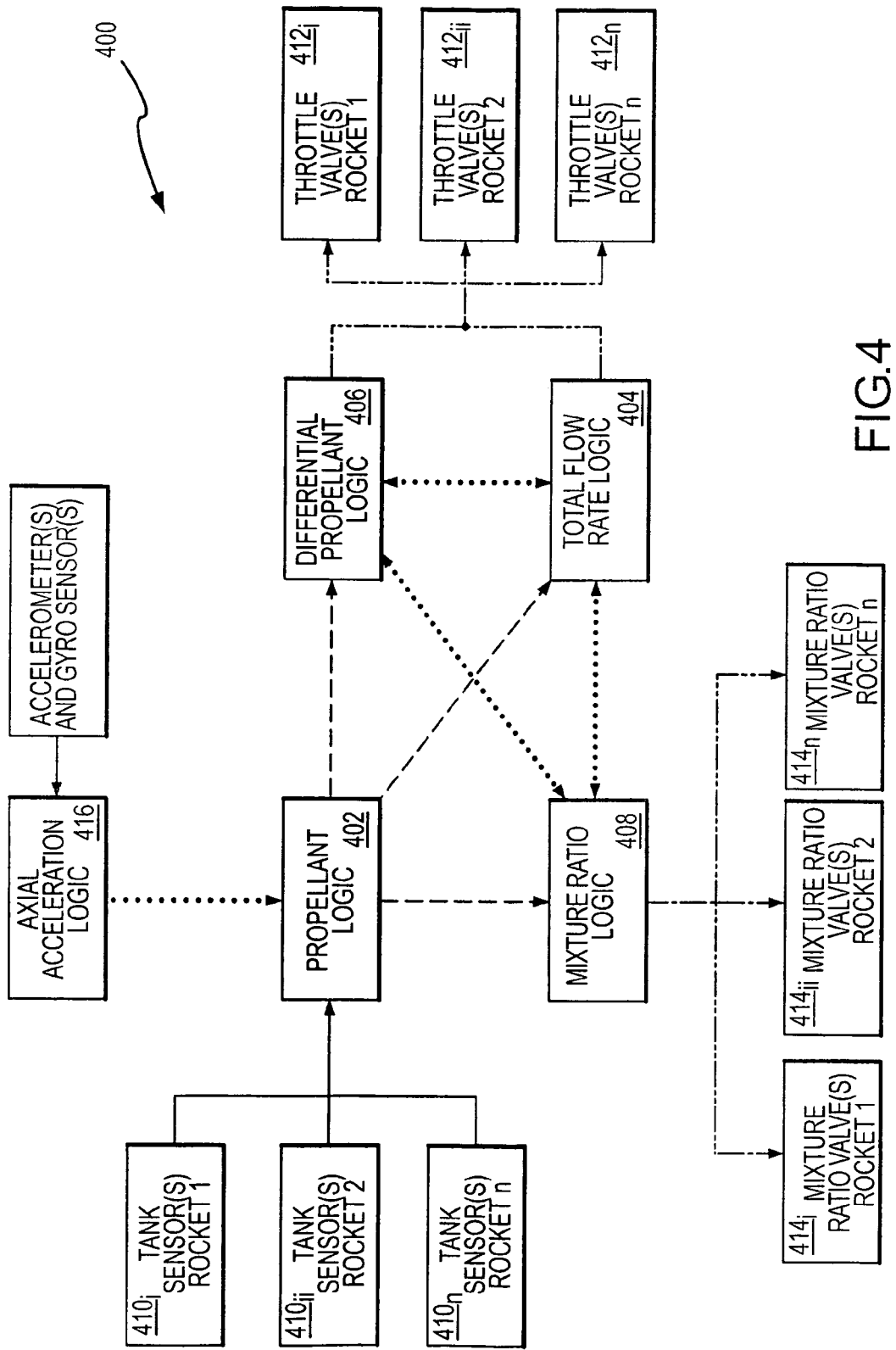
FIG. 4 illustrates one embodiment of a propellant management system for a launch vehicle that uses multiple liquid booster rockets.

Referring now to FIG. 4, a multiple rocket propellant management system 400 is described. Tank sensors $410_i$, $410_{ii}$, $410_n$ associated with each of the liquid propellant rockets measure information relating to a first measurement parameter. In one approach, the first measurement parameter may be the hydrostatic pressure head within one or more propellant tanks and/or feed lines. Tank sensors $410_i$, $410_{ii}$, $410_n$ may be operatively connected to propellant logic 402. The propellant logic 402 generally may be any logic, circuitry or software adapted to receive and process information from any of the tanks sensors $410_i$, $410_{ii}$, $410_n$. In one approach, the propellant logic 402 and tank sensors $410_i$, $410_{ii}$, $410_n$ may be operably connected and adapted, wherein the propellant logic 402 may calculate the remaining mass of liquid in each of the tanks of each of the rockets at a single point in time (e.g., at time=t). In another aspect, the propellant logic 402 may be adapted to receive and monitor information from the tank sensors $410_i$, $410_{ii}$, $410_n$ over a specified time interval (e.g., every 0.1, 0.5, 1, 2, 3, 4, 5 or 10 seconds), wherein the propellant logic 402 is adapted to calculate and/or send signals relating to the amount of mass in each of the tanks of each of the rockets over a period of time (e.g., to determine a mass flow rate). In one approach, information from the tank sensors $410_i$, $410_{ii}$, $410_n$ is supplied to the propellant logic 402 from the time the first stage is activated until about the time one of the tank sensors $410_i$, $410_{ii}$, $410_n$ senses that one of the active rockets has a propellant constituent below a predetermined threshold level and the flight computer terminates operation of the first stage. However, it may be desirable for the propellant logic 402 to defer being able to control at least certain operations until after the passage of a certain amount of time after the initial lift-off of the launch vehicle.

The propellant logic 402 may be configured to receive various data relating to each of the liquid booster rockets. For instance, the propellant logic 402 could be configured to receive information relating to the remaining amount of the same first propellant constituent for each of the liquid propellant rockets (e.g., the remaining amount or mass of fuel for each of the liquid booster rockets; the remaining amount or mass of oxidizer for each of the liquid booster rockets). The propellant logic 402 could also be configured to receive information relating to the remaining amount of each propellant constituent for each of the liquid booster rockets (e.g., the remaining amount or mass of fuel and oxidizer for each of the liquid booster rockets). In any case, the propellant logic 402 may calculate the desired parameter(s) (e.g., mass, mass flow rate) based upon the data provided by the tank sensors $410_i$, $410_{ii}$, $410_n$. One way to calculate the amount of mass in a particular propellant tank is to utilize a sensed pressure within the propellant tank in combination with the sensed acceleration of the launch vehicle, as calculated by the flight computer. In some instances, the acceleration of the propellant tank in question may differ from the acceleration calculated by the flight computer for one or more reasons. In this regard, an axial acceleration logic or controller 416 may be provided to adjust the acceleration value that is used to calculate the mass in a particular propellant tank by an onboard estimation of an axial acceleration term associated with the propellant tank.

The propellant logic 402 may be operably connected to one or more of a total flow rate logic or controller 404, a differential propellant logic or controller 406 and a mixture ratio logic or controller 408 to provide information corresponding to the first measurement parameter. Preferably, the propellant logic 402 is operatively connected to each of the total flow rate logic 404, the differential propellant logic 406, and the mixture ratio logic 408. For example, the propellant logic 402 may be operably connected to the total flow rate logic 404 to provide information relating to the mass of the propellant constituent(s) of choice in each of the active liquid booster rockets over a period of time (i.e., a propellant mass flow rate). The propellant logic 402 also may be operably connected to the differential propellant logic 406 to provide the total mass of the propellant constituent(s) of choice for each of the active liquid booster rockets. The propellant logic 402 also may be operably connected to the mixture ratio logic 408 to provide information relating to the mass of each of the propellant constituents associated with each individual active liquid booster rocket. As is discussed in further detail below, the propellant logic 402 may also be operably connected to the above-noted axial acceleration logic 416 to receive information relating to the axial acceleration of the launch vehicle to compensate for calculations made by the propellant logic 402 relating to the first measurement parameter.

The total flow rate logic 404, the differential propellant logic 406, and the mixture ratio logic 408 each provide a different functionality in relation to the control of the various liquid booster rockets that may be used by a launch vehicle. As noted above, preferably each of these logics 404, 406, and 408 may be utilized by a given launch vehicle to control the liquid booster rockets during flight in a desired manner. Generally, each of these logics 404, 406, and 408 are able to generate a particular error signal. Any such error signal is preferably provided to a proportional and integral control algorithm or controller (P-I controller) that attempts to drive the relevant error signal to zero in a desired manner. The general functionality of each of the total flow rate logic 404, the differential propellant logic 406, and the mixture ratio logic 408 will now be addressed.

Generally, the total flow rate logic 404 may be configured to determine the manner in which an individual liquid booster rocket should have its thrust or throttle regulator valve adjusted during flight, if at all, based upon a comparison of the sensed flow rate of the propellant constituent(s) of choice ("sensed" meaning being determined by numerically differentiating the sensed mass of the propellant constituent(s) of choice over a specified period of time), and the pre-programmed flow rate for this same propellant constituent(s) that is provided in relation to this same liquid booster rocket. The total flow rate logic could consider a single propellant constituent of a particular booster, but more preferably consider each propellant constituent used by the booster. The "pre-programmed flow rate" may be characterized as a throttle profile that controls the throttling of the liquid booster rocket during flight, and this throttle profile is typically stored in or used by the flight computer of the launch vehicle. More generally, the total flow rate logic 404 in effect compares the actual thrust or overboard propellant flow rate of a particular liquid booster rocket with the thrust or overboard propellant flow rate that should exist based upon the pre-programmed throttle profile that is being used to operate this liquid booster rocket during flight. Any error signal generated by the total flow rate logic 404 is preferably provided to a P-I controller, which, in turn, generates a throttling command to send to the relevant liquid booster rocket. That is, the total flow rate logic 404 operatively interfaces with the thrust or thrust regulator valve of each liquid booster rocket associated with the launch vehicle.

The total flow rate logic 404 considers each liquid booster rocket of the launch vehicle individually. This may be done in any appropriate manner. A separate total flow rate logic 404 could be provided for each liquid booster rocket of the launch vehicle, or a common total flow rate logic 404 could be configured in a manner to allow it to independently assess and control each liquid booster rocket of the launch vehicle.

The total flow rate logic 404 could look at the mass flow rate of the fuel, the oxidizer, or both in relation to separately assessing each individual liquid booster rocket of the launch vehicle. Using the total flow rate logic 404 in combination with the mixture ratio logic 408 allows the total flow rate logic 404 to look at the mass flow rate of either the fuel or the oxidizer for an individual liquid booster rocket. If there is a change in the flow rate of one of the fuel or oxidizer via the total flow rate logic 404, the mixture ratio logic 408 should make a corresponding change in the flow rate of the other of the fuel or oxidizer, as is discussed in more detail below. It should be appreciated that the total flow rate logic 404 could be configured to look at the mass flow rate of both the fuel and oxidizer for an individual liquid booster rocket as well.

The differential propellant logic 406 may be configured to control the operation of each of the various liquid booster rockets of the launch vehicle in a manner so that the propellant associated with each of the various liquid booster rockets is at least substantially depleted at least substantially at the same time. Since the various liquid booster rockets of the launch vehicle are simultaneously shut down and thereafter simultaneously jettisoned from the launch vehicle (typically via the flight computer), it is desirable that the amount of propellant associated with each of the liquid booster rockets is at least minimized, and more preferably at least substantially depleted, prior to shut down and jettisoning. The differential propellant logic 406 provides this minimization function, with the ultimate goal being that each liquid booster rocket of the launch vehicle reaches propellant depletion at substantially the same time.

The differential propellant logic 406 provides the above-noted control function by collectively assessing each of the various liquid booster rockets associated with the launch vehicle. That is, the differential propellant logic 406 attempts to identify a differential propellant loading between each of the liquid booster rockets used by the launch vehicle, and to thereafter achieve a balance of the propellant loading amongst all liquid booster rockets by the time that they are shut down and then jettisoned from the launch vehicle. Any error signal generated by the differential propellant logic 406 relating to the existence of a differential propellant loading is preferably provided to a P-I controller, that in turn will generate a throttling command to send to a particular liquid booster rocket. That is, the differential propellant logic 406 also operatively interfaces with the thrust or thrust regulator valve of each liquid booster rocket associated with the launch vehicle.

There are a number of points worth mentioning at this time in relation to the differential propellant logic 406. One is that the differential propellant loading between the various liquid booster rockets only need be driven to the desired minimum amount (preferably zero) at the time that the liquid booster rockets are simultaneously shut down for subsequent jettisoning from the launch vehicle. Therefore, the development of a differential propellant loading between two or more liquid booster rockets during the initial portion of a flight may only require a relatively small change to the throttling of a particular liquid booster rocket in order to have a balanced propellant loading at the time of shut down. Another point is that, preferably, the liquid booster rocket that is burning "faster" (having the least amount of propellant) is "throttled down" to address an identified differential propellant loading. However, the liquid booster rocket that is burning "slower" (having the most amount of propellant) could be "throttled up" as well and still address a differential propellant loading between the liquid booster rockets of the launch vehicle.

The differential propellant logic 406 could look at the mass or level of the fuel, the oxidizer, or both in relation to each liquid booster rocket. Using the differential propellant logic 406 in combination with the mixture ratio logic 408 allows the differential propellant logic 406 to look at the mass of either the fuel or the oxidizer for each liquid booster rocket. If there is a change in the flow rate of one of the fuel or oxidizer for a particular liquid booster rocket via the differential propellant logic 406, the mixture ratio logic 408 should make a corresponding change in the flow rate of the other of the fuel or oxidizer for this same liquid booster rocket. It should be appreciated that the differential propellant logic 406 could be configured to look at the mass or level of both the fuel and oxidizer for each individual liquid booster rocket as well when making its comparison amongst the various liquid booster rockets to assess and address a differential propellant loading.

The mixture ratio logic 408 may be configured to determine the manner in which a particular liquid booster rocket should have the amount of fuel and the amount of oxidizer being provided to its combustion chamber adjusted, if at all, so that no more than a certain amount of fuel and oxidizer remains when its corresponding engine(s) is shut down for jettisoning from the launch vehicle. That is, it would be desirable for the fuel and oxidizer of each individual liquid booster rocket to run out at substantially the same time, or at least such that there is only a minimal amount of fuel and oxidizer left in relation to any individual liquid propellant rocket. As such, the mixture ratio logic 408 considers each liquid booster rocket of the launch vehicle individually.

Generally, the mixture ratio logic 408 attempts to identify a differential loading of sorts between the individual propellant constituents of each individual liquid booster rockets used by the launch vehicle, and to thereafter achieve a balance of the propellant constituent loading in each individual liquid booster rockets by the time that they are shut down and then jettisoned from the launch vehicle. Any error signal generated by the mixture ratio logic 408 relating to the existence of a differential propellant constituent loading in a particular liquid booster rocket is preferably provided to a P-I controller, that in turn will generate an appropriate control command that is sent to the mixture ratio valve(s) of a corresponding liquid booster rocket.

The mixture ratio logic 408 considers each liquid booster rocket of the launch vehicle individually. This may be done in any appropriate manner. A separate mixture ratio logic 408 could be provided for each liquid booster rocket of the launch vehicle. Another option would be for a common mixture ratio logic 408 to be configured in a manner to allow it to independently asses and control each liquid booster rocket of the launch vehicle in the above-described manner.

The total flow rate logic 404 may be any logic, circuitry, software or controller adapted to receive information from the propellant logic 402 and send information to one or more throttle valves $412_i$, $412_{ii}$, $412_n$ located in at least one of the rockets. In one embodiment, the total flow rate logic 404 is adapted to receive information from the propellant logic 402 relating to mass flow rates of each of the propellant constituents in each of the active rockets over time (e.g., every 0.1, 0.5, 1, 2, 3, 4, 5, or 10 seconds). The total flow rate logic 404 may be further adapted to process this information in conjunction with a theoretical or pre-programmed flow rate parameter and to send signals to one or more throttle or throttle regulator valves $412_i$, $412_{ii}$, $412_n$ such that the total flow rate of propellant constituents remains within a predetermined specified threshold for each of the active liquid booster rockets. For example, the total flow rate logic 404 may determine that the total flow rate of a second propellant constituent in one of the active rockets is higher or lower than a predetermined theoretical value. In such a circumstance, the total flow rate logic 404 may send signals to a valve, such as a throttle valve, located in the corresponding rocket to operate the valve and decrease and/or increase the amount of second propellant constituent being utilized/expended. The total flow rate logic 404 may also be adapted to send signals to more than one valve and to more than one rocket, either in parallel or serially, as necessary to maintain propellant flow rates within a predetermined threshold for each of the active rockets.

In one approach, the total flow rate logic 404 is closed-loop and does not provide its generated signal to other logic components. In one embodiment, the total flow rate logic 404 may be a proportional-integral logic that sends signals to one or more throttle valves to attempt to drive any errors it calculates to zero. In one embodiment, the total flow rate logic 404 may also be operably connected to the differential propellant logic 406 and/or the mixture ratio logic 408 to receive information relating to signals produced by either the different propellant logic 406 and/or the mixture ratio logic 408, and the total flow rate logic 404 may be adapted to process such signals to compensate for signals it sends. For example, the total flow rate logic 404 may utilize the information provided by the differential propellant logic 406 and/or the mixture ratio logic 408 to adjust its produced signal(s) by adding or subtracting to the strength of its signal(s) or by eliminating its signal(s) altogether. The total flow rate logic 404 may also be operably connected to the differential propellant logic 406 and/or the mixture ratio logic 408 to send information relating to signals it produces such that the differential propellant logic 406 and/or the mixture ratio logic 408 may utilize such information. For example, the differential propellant logic 406 and/or the mixture ratio logic 408 may utilize the information provided by the total flow rate logic 404 to adjust the signal(s) each of them may produce by adding or subtracting to the strength of the signal(s) or by eliminating the signal(s) altogether.

The differential propellant logic 406 may be any logic, circuitry, software or controller adapted to receive information from the propellant logic 402 over time (e.g., every 0.1, 0.5, 1, 2, 3, 4, 5 or 10 seconds) and send information to one or more throttle or throttle regulator valves $412_i$, $412_{ii}$, $412_n$ located in at least one of the rockets. In one embodiment, the differential propellant logic 406 is adapted to receive information relating to the total mass of propellant constituents in each of the rockets from the propellant logic 402 and processes this information to create and send signals to the one or more throttle regulator valves $412_i$, $412_{ii}$, $412_n$ such that the active rockets achieve essentially simultaneous depletion of the propellant constituents (e.g., such that each liquid booster rocket "runs out" of propellant at substantially the same time). For example, the differential propellant logic 406 may determine that the total mass of a propellant constituent in a first active rocket is greater than the total mass of the same type of propellant constituent in a second active rocket. In such a circumstance, the differential propellant logic 406 may then send signals to a valve, such as a throttle valve, located in the either the first or second rocket to operate the valve and decrease and/or increase the amount of a propellant constituent being utilized/expended. The differential propellant logic 406 may also be adapted to send signals to more than one valve and to more than one rocket, either in parallel or serially, as necessary, to help achieve simultaneous depletion of propellant constituents in each of the active rockets.

In one approach, the differential propellant logic 406 is closed-loop and does not provide the signal it generates to the other logic components. In one embodiment, the differential propellant logic 406 may be a proportional-integral logic that sends signals to one or more throttle valves to attempt to drive any errors it calculates to zero. In another aspect, the differential propellant logic 406 may also be operably connected to the total flow rate logic 404 and/or the mixture ratio logic 408 to receive information relating to signals produced by either the total flow rate logic 404 and/or the mixture ratio logic 408, and the differential propellant logic 406 may be adapted to process such signals to adjust the signals it sends, as discussed above. The differential propellant logic 406 may also be operably connected to the total flow rate logic 404 and/or the mixture ratio logic 408 to send information relating to signals it produces such that the total flow rate logic 404 and/or the mixture ratio logic 408 may utilize such information, as discussed above.

In one approach, the total flow rate logic 404 and/or differential logic 406 signal(s) are provided to the throttle valve in any appropriate manner on a time-related basis (e.g., at a desired frequency or periodic basis). It may be desirable for the total flow rate logic 404 and/or differential propellant logic 406 to be limited in relation to magnitude of the adjustments that can be made to the throttle valve. Small adjustments to the throttle valve may help minimize axial acceleration imbalances in the launch vehicle, which can translate to controller instability, as discussed below.

The mixture ratio logic 408 may be any logic, circuitry, software or controller adapted to receive information from the propellant logic 402 over time (e.g., every 0.1, 0.5, 1, 2, 3, 4, 5 or 10 seconds) and send information to one or more mixture ratio valves located in at least one of the rockets. In one embodiment, the mixture ratio logic 408 is adapted to receive information relating to the mass of first and second propellant constituents in a single active rocket from the propellant logic 402 and processes this information to create and send signals to one or more valves, (e.g., mixture ratio valves), such that the first and second propellant constituents in a single rocket are depleted simultaneously, as described in commonly-owned U.S. patent application Ser. No. 10/052,126 filed Jan. 17, 2002 titled "PROPELLANT UTILIZATION SYSTEM", now U.S. Pat. No. 6,631,314, the contents of which are incorporated herein by reference in their entirety.

The mixture ratio logic 408 also may be operably connected to the mixture ratio valves $414_i$, $414_{ii}$, $414_n$ of more than a single active rocket. In this embodiment, the mixture ratio logic 408 may be employed to manage the depletion of the propellant constituents of each active rocket such that the two or more propellant constituents in an individual rocket are depleted simultaneously. Thus, the mixture ratio logic 408 helps control depletion of at least first and second propellant constituents (e.g., liquid oxygen and rocket fuel) in relation to one another within an individual rocket without reference to the total mass of propellant remaining in any of the other active rockets. Conversely, the differential propellant logic 406 helps control depletion of propellant constituents between active rockets (e.g., the total mass of liquid oxygen and/or rocket fuel in rocket 1 as compared to the total mass of liquid oxygen and/or rocket fuel in rocket 2), such that all active rockets essentially achieve simultaneous depletion of all propellant constituents without reference to the relative amounts of first and second propellant constituents remaining in a single rocket.

In one approach, the mixture ratio logic 408 is closed-loop and does not provide the signal it generates to the other logic components. For example, the mixture ratio logic 408 may be a proportional-integral logic that sends signals to one or more mixture ratio valves to attempt to drive any errors it calculates to zero. The mixture ratio logic 408 may also be operably connected to the total flow rate logic 404 and/or the differential propellant logic 406 to receive information relating to signals produced by either the total flow rate logic 404 and/or the differential propellant logic 406, and the mixture ratio logic 408 may be adapted to process such signals to adjust the signals it sends, as discussed above. The mixture ratio logic 408 may also be operably connected to the total flow rate logic 404 and/or the differential propellant logic 406 to send information relating to signals it produces such that the total flow rate logic 404 and/or the differential propellant logic 406 may utilize such information, as discussed above.

The axial acceleration logic 416 is a logic system that may be operably connected to the propellant logic 402 to help compensate for errors in calculations completed by the propellant logic 402 based on the first measurement parameter (e.g., pressure head measurements). As will be appreciated, use of the total flow rate logic 404, differential propellant logic 406 and/or mixture ratio logic 408 may result in a thrust imbalance between two or more of the active rockets of the launch vehicle due to an imbalance in the supply of propellant constituents in one or more active rockets. This thrust imbalance may cause the launch vehicle to turn in an undesired direction. Upon sensing movement in an undesired direction, the pilot or autopilot of the launch vehicle may attempt to compensate for the undesired movement, such as by a movement of one or more of the rocket engines (typically movably interconnected by a gimbal), to attempt to return the launch vehicle to the desired course. This movement by the pilot/autopilot may create an axial acceleration imbalance between two or more of the active rockets.

The axial acceleration of the launch vehicle can be represented as the product of the angular acceleration ($\alpha$) and the moment arm (r) between the centerline of the launch vehicle and the centerline of each of the liquid booster rockets. The axial acceleration ($\alpha \times r$) results in a change in the acceleration field of the propellant tanks within each of the rockets, and generally results in a higher pressure head measurement for at least one tank in one or more of the rockets and a corresponding lower pressure head measurement for at least one tank in one or more of the other rockets. Since propellant constituent mass may be calculated using pressure head measurements, error(s) in the sensed pressure head due an axial acceleration of the launch vehicle could translate to error(s) in the calculated propellant masses. Such error(s) may be compounded when the space vehicle utilizes any of the total mass flow logic 404, differential propellant logic 406 and/or mixture ratio logic 408 due to significant coupling between corrections by the pilot/autopilot and the total flow rate logic 404, differential propellant logic 406 and/or mixture ratio logic 408. In an extreme circumstance, numerical instability may manifest in the total flow rate logic 404, differential propellant logic 406 and/or mixture ratio logic 408, wherein the commands from the pilot/autopilot diverge from the commands from the total flow rate logic 404, differential propellant logic 406 and/or mixture ratio logic 408.

The axial acceleration logic 416 generally is connected to the propellant logic to provide information relating to the acceleration of each of the liquid booster rockers the vehicle as measured by one or more accelerometers and gyro sensor (s) 418 located on the launch vehicle 100. The angular acceleration is computed via manipulation of the rate gyro signals on the booster. The rate gyro signals are numerically differentiated by the axial acceleration logic 416 to obtain the angular acceleration of the various components of the launch vehicle (e.g., the angular acceleration of each liquid booster rocket). Preferably, the rate gyro signals are first filtered to remove higher frequency noise. The axial acceleration logic 416 uses this angular acceleration information in conjunction with the known moment arm (equal to the distance between the respective centerlines of each of the rockets) to calculate the axial acceleration of the launch vehicle. The axial acceleration information, including the angular acceleration of each liquid booster rocket, may then be provided to the propellant logic to compensate for the mass calculations. For example, the propellant logic 402 may adjust the acceleration calculation used in the computation of the 1-g field for each of the active rockets.

Figures 1, 5A:
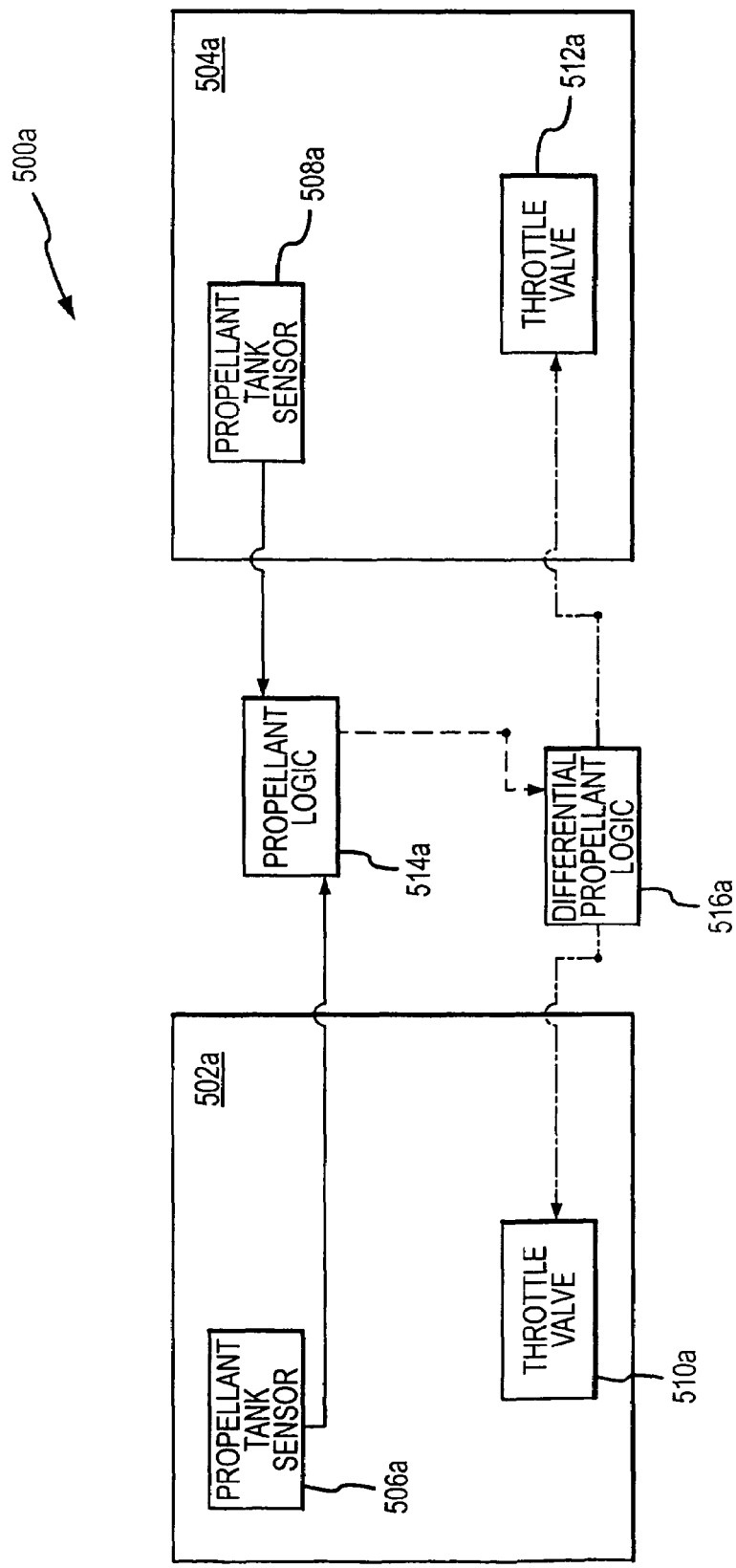
Figures 2, 5A:
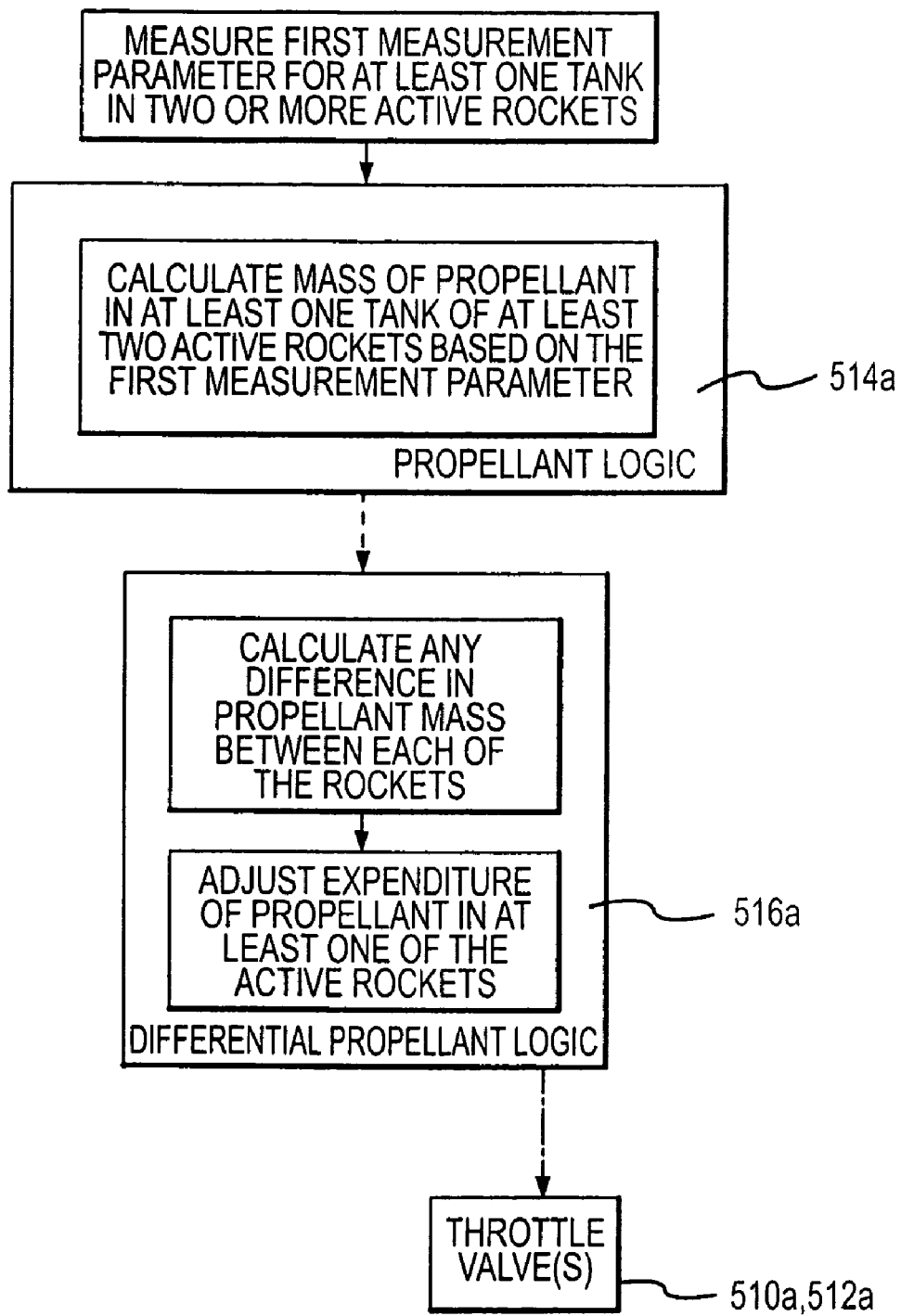

One embodiment of a launch vehicle that uses a differential propellant logic of the above-noted type is illustrated in FIG. 5*a*-1 and is identified by reference numeral 500*a*. The launch vehicle 500*a* comprises a first booster rocket 502*a* and a second booster rocket 504*a* (any number of multiple booster rockets could be used by the launch vehicle 500*a*), with the booster rockets 502*a*, 502*b* including at least a tank sensor 506*a*, 508*a* and a throttle valve 510*a*, 512*a*, respectively. Propellant logic 514*a* may be operatively connected to the tank sensors 506*a*, 508*a* and differential propellant logic 516*a*, as described above. The differential propellant logic 516 may be operatively connected to throttle or throttle regulator valves 510*a*, 512*a*.

The operation of the launch vehicle 500*a* depicted in FIG. 5*a*-1 will now be described in relation to FIG. 5*a*-2. Tank sensors measure the first measurement parameter for at least one tank in at least two of the active rockets and such information is provided to the propellant logic 514*a*. In one approach, the tank sensors measure the first measurement parameter for each tank in each of the plurality of active rockets. The propellant logic 514a calculates the mass of propellant in at least one tank of at least two of the active rockets based on the first measurements parameter and may provide such information to the differential propellant logic 516a. In one approach, the propellant logic 514a calculates the mass of propellant in each tank of each active rocket. The differential propellant logic 516a may utilize the information received from the propellant logic 514a to calculate any difference in propellant mass between each of the rockets and may adjust expenditure of propellant in at least one of the active rockets by sending signals to at least one of the throttle valves.

Figures 1, 5B:
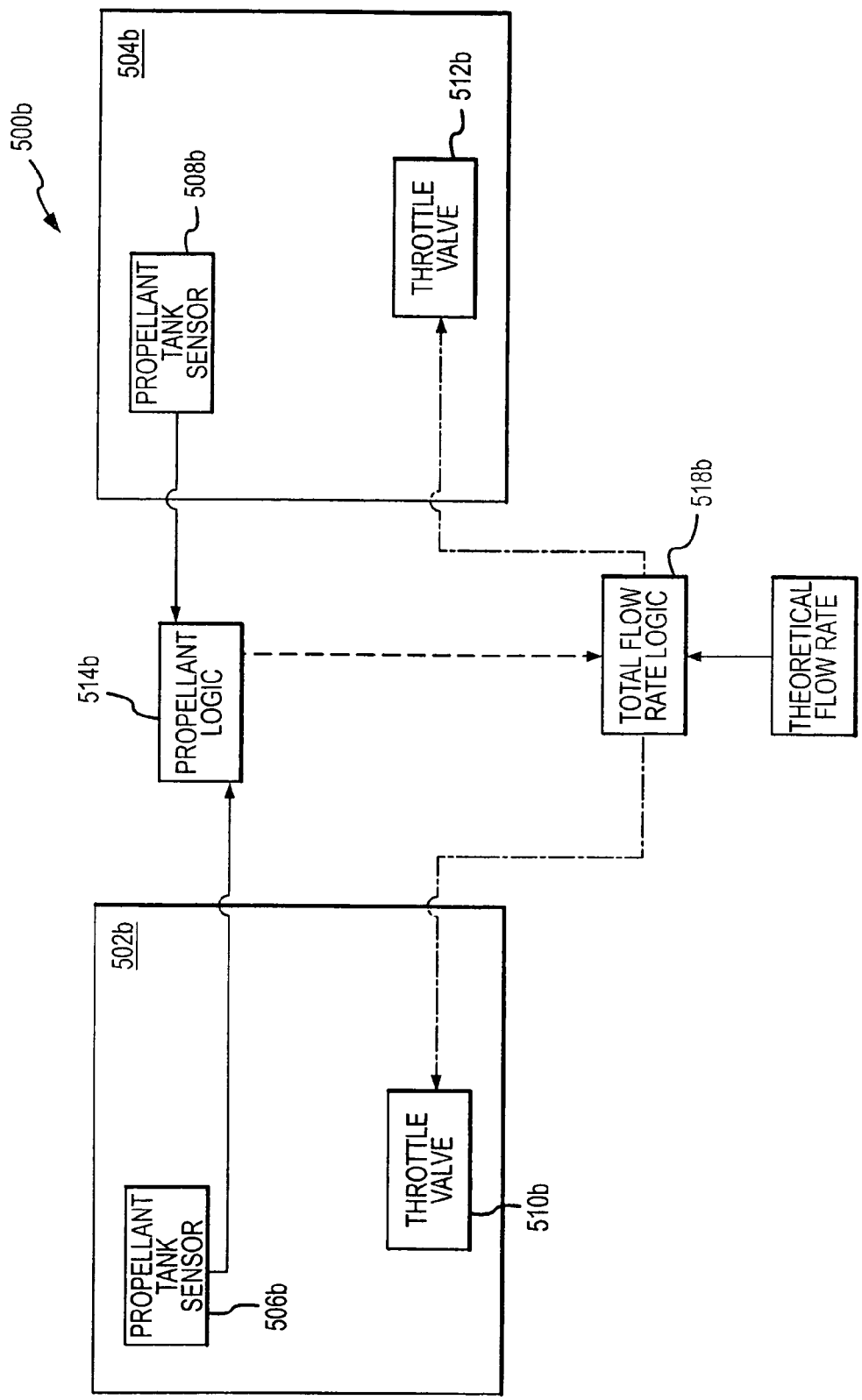
Figures 2, 5B:
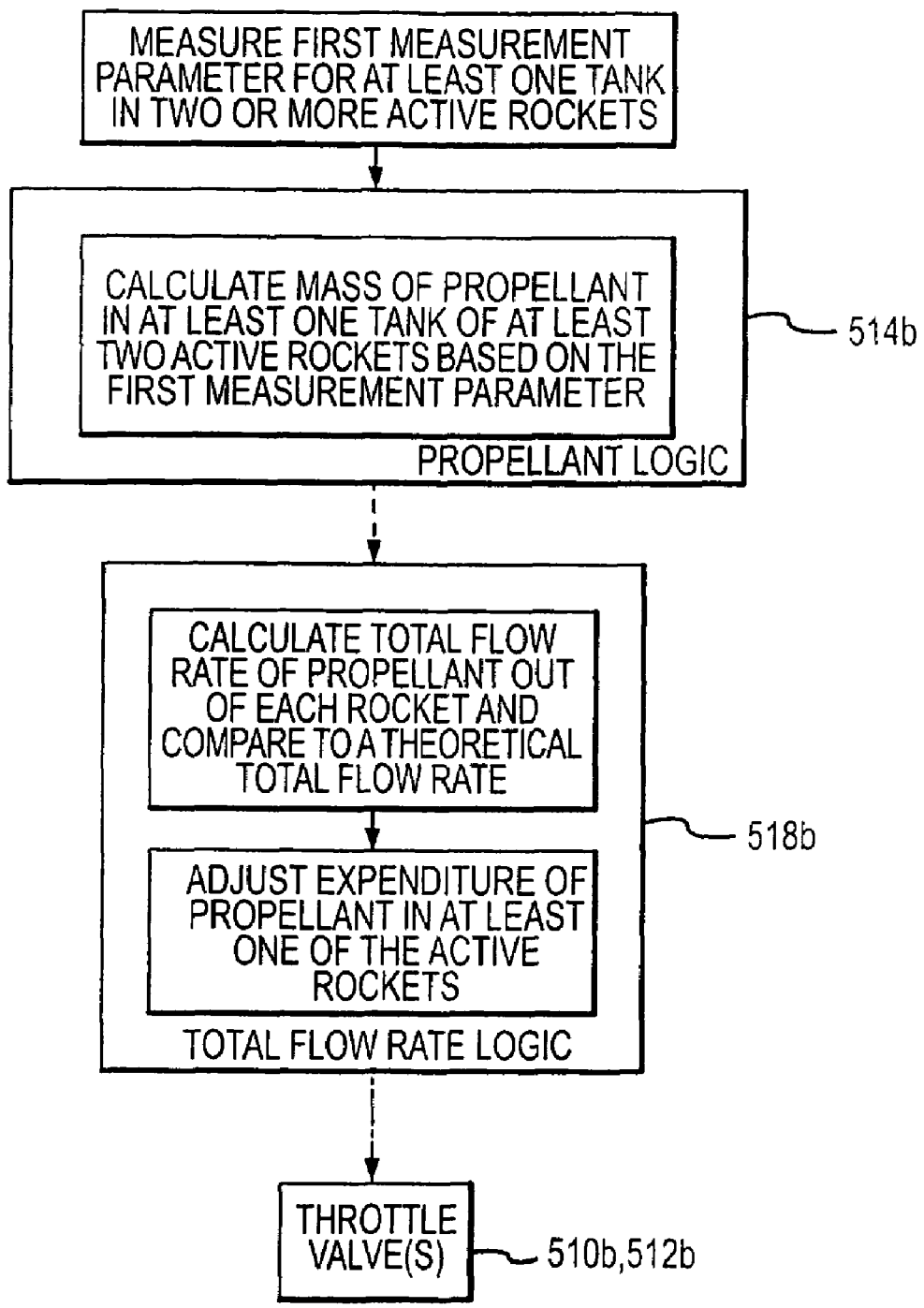

One embodiment of a launch vehicle that uses a total flow rate logic is illustrated in FIG. 5b-1 and is identified by reference numeral 500b. The launch vehicle 500b comprises a first rocket 502b and a second rocket 504b (any number of multiple booster rockets could be used by the launch vehicle 500b), with the rockets 502b, 504b including at least a tank sensor 506b, 508b and a throttle valve 510b, 512b, respectively. Propellant logic 514b may be operatively connected to the tank sensors 506b, 508b and total flow rate logic 518b, as described above. The total flow rate logic 518b may be operatively connected to throttle or throttle regulator valves 510b, 512b.

The operation of the launch vehicle 500b depicted in FIG. 5b-1 will now be described in relation to FIG. 5b-2. Tank sensors measure the first measurement parameter for at least one tank in at least two of the active rockets and such information is provided to the propellant logic 514b. In one approach, the tank sensors measure the first measurement parameter for each tank in each of the plurality of active rockets. The propellant logic 514b calculates the mass of propellant in at least one tank of at least two of the active rockets based on the first measurements parameter and may provide such information to the total flow rate logic 518b over time. In one approach, the propellant logic 514b calculates the mass of propellant in each tank of each active rocket. The total flow rate logic 518b may utilize the information received from the propellant logic 514b to calculate the total flow rate of propellant out of each rocket and compare such total flow rate calculations to a predetermined theoretical total flow rate value. The total flow rate logic 518b may then adjust expenditure of propellant in at least one of the active rockets by sending signals to at least one of the throttle valves.

Figures 1, 5C:
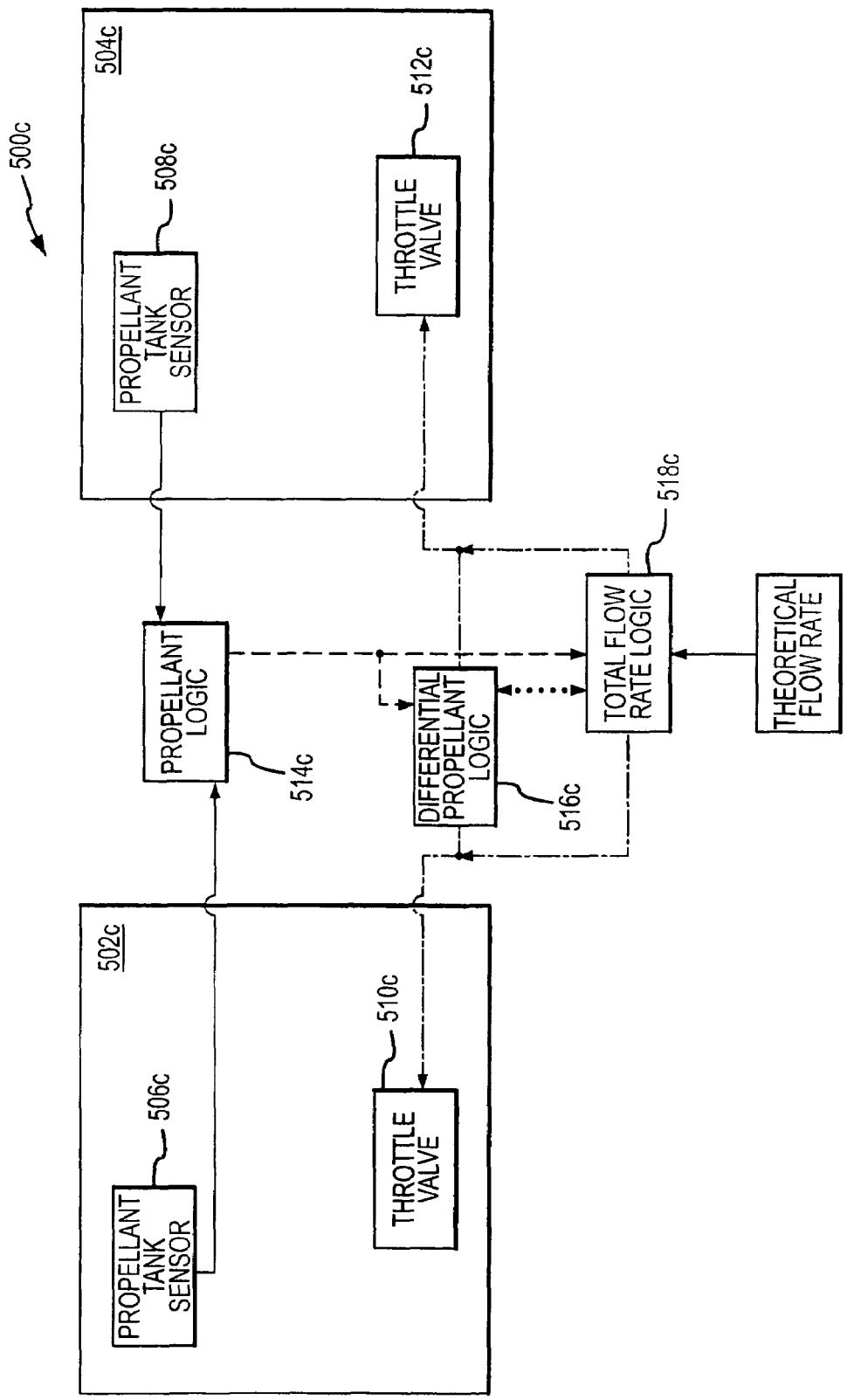
Figures 2, 5C:
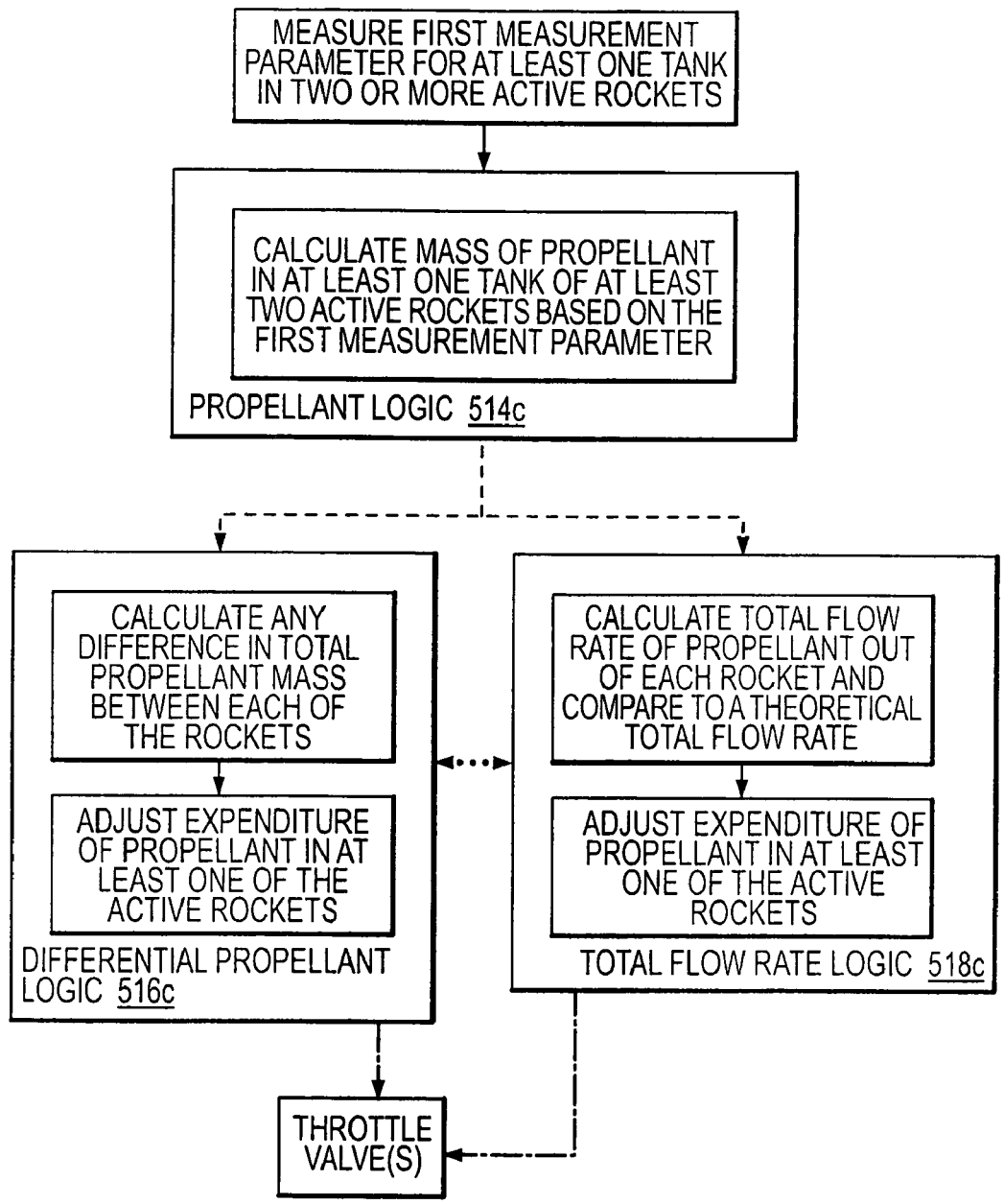
Figures 3, 5C:
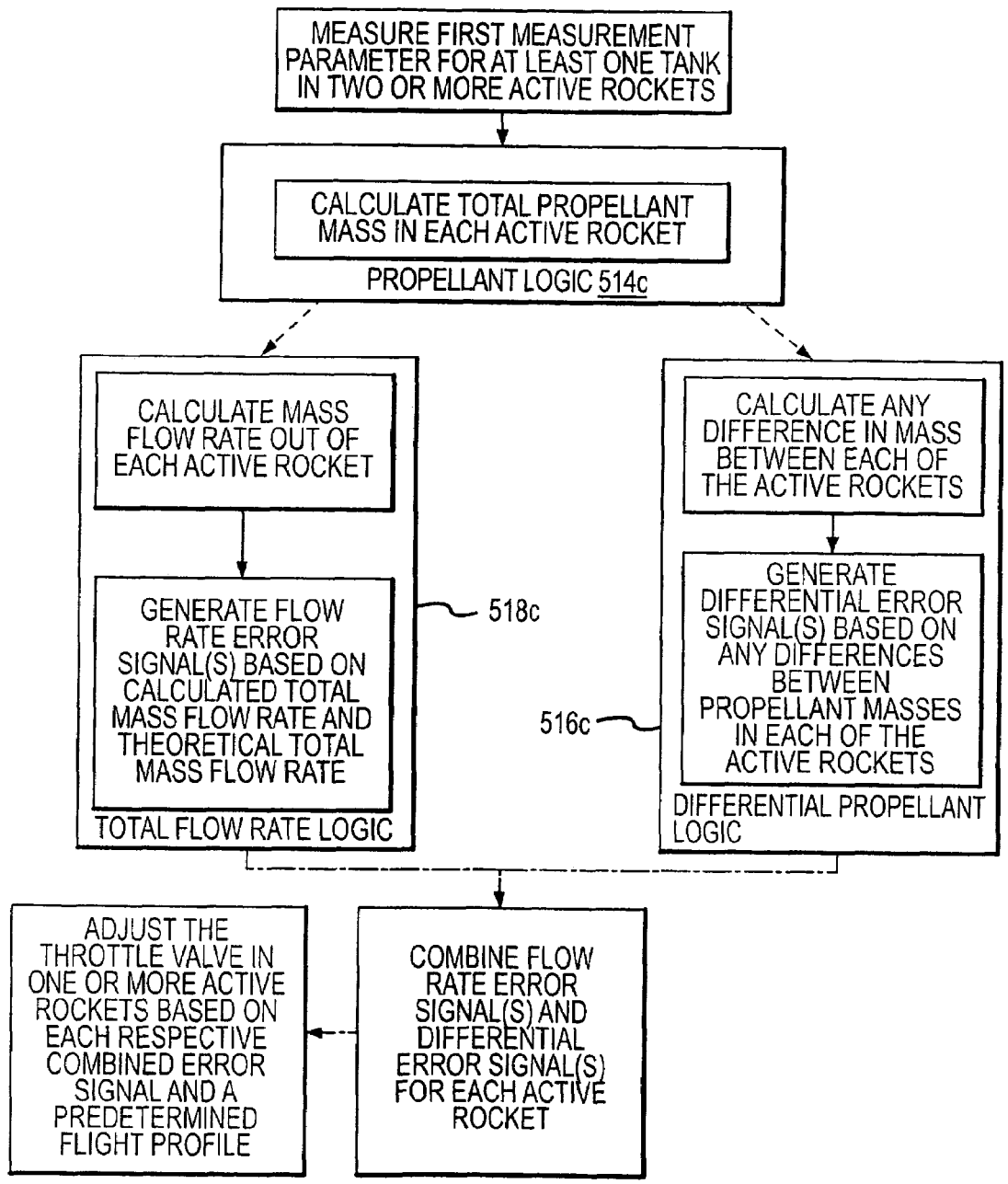

One embodiment of a launch vehicle that uses both a differential propellant logic and total flow rate logic is illustrated in FIG. 5c-1 and is identified by reference numeral 500c. The launch vehicle 508c comprises a first rocket 502c and a second rocket 504c (any number of multiple booster rockets could be used by the launch vehicle 500c), with the rockets 502c, 504c including at least a tank sensor 506c, 508c and a throttle valve 510c, 512c, respectively. Propellant logic 514c may be operatively connected to the tank sensors 506c, 508c, differential propellant logic 516c and/or total flow rate logic 518c, as described above. The differential propellant logic 516c and total flow rate logic 518c may each be operatively connected to throttle valves 510c, 512c. In one approach, the differential propellant logic 516c and total flow rate logic 518c are also operatively connected, as depicted by the dotted line.

The operation of the launch vehicle 500c depicted in FIG. 5c-1 will now be described in relation to FIG. 5c-2. Tank sensors measure the first measurement parameter for at least one tank in at least two of the active rockets and such information is provided to the propellant logic 514c. In one approach, the tank sensors measure the first measurement parameter for each tank in each of the plurality of active rockets. The propellant logic 514c calculates the mass of propellant in at least one tank of at least two of the active rockets based on the first measurements parameter and may provide such information to the differential propellant logic 516c and/or total flow rate logic 518c over time. In one approach, the propellant logic 514c calculates the mass of propellant in each tank of each active rocket.

The differential propellant logic 516c may utilize the information received from the propellant logic 514c to calculate any difference in total propellant mass between each of the rockets and may adjust expenditure of propellant in at least one of the active rockets by sending signals to at least one of the throttle valves. The total flow rate logic 518c may utilize the information received from the propellant logic 514c to calculate the total flow rate of propellant out of each rocket, compare such total flow rate calculations to a predetermined theoretical total flow rate value specific to the rocket, and may adjust expenditure of propellant in at least one of the active rockets by sending signals to at least one of the throttle valves. In one aspect of the present embodiment, the differential propellant logic 516c and total flow rate logic 518c may send their signals in series to at least one of the throttle valves. In yet another approach of the present embodiment, the differential propellant logic 516c and total flow rate logic 518c may send their signals in parallel to at least one of the throttle valves 510c, 512c, wherein the signals are combined prior to reaching the throttle valve 510c, 512c to create a master throttle valve signal. As described above, the differential propellant logic 516c and total flow rate logic 518c may also be operatively connected to communicate regarding the signals each is producing so that the other may process such information in conjunction with any signals it produces, as depicted by the dotted line.

FIG. 5c-3 illustrates one embodiment of a sequence for combining the signals of the differential propellant logic 516c and the total flow rate logic 518c that may be provided to one or more throttle valves. As described above, tank sensors measure the first measurement parameter for at least one tank in at least two of the active rockets and such information is provided to the propellant logic 514c. In one approach, the tank sensors measure the first measurement parameter for each tank in each of the plurality of active rockets. The propellant logic 514c calculates the mass of propellant in at least one tank of at least two of the active rockets based on the first measurements parameter and may provide such information to the differential propellant logic 516c and/or total flow rate logic 518c over time. In one approach, the propellant logic calculates the mass of propellant in each tank of each active rocket.

The differential propellant logic 516c may utilize information received from the propellant logic to calculate any difference in total propellant mass between each of the rockets and may generate differential error signal(s) based on any differences between the total propellant masses in each of the active rockets. The total flow rate logic 518c may utilize information received from the propellant logic to calculate the total mass flow rate of propellant out of each rocket, compare such total flow rate calculations to a predetermined theoretical total flow rate value and may generate flow rate error signal(s) based on such comparison. The differential error signal(s) and total flow rate error signal(s) may be combined in a known manner for each active rocket to create a master error signal, whereafter the throttle valve in one or more of the active rockets may be adjusted based on the master error signal and a predetermined flight profile. In one approach (not shown), the differential error signal(s) may be generated and provided only to active rocket(s) that require a reduction in the amount of a propellant constituent supplied to the combustion chamber. For example, the differential error signal(s) may only be provided to active rockets which will result in the throttle valve being operated such that a reduced amount of rocket fuel, such as kerosene, is supplied to the one or more combustion chambers.

Figures 1, 5D:
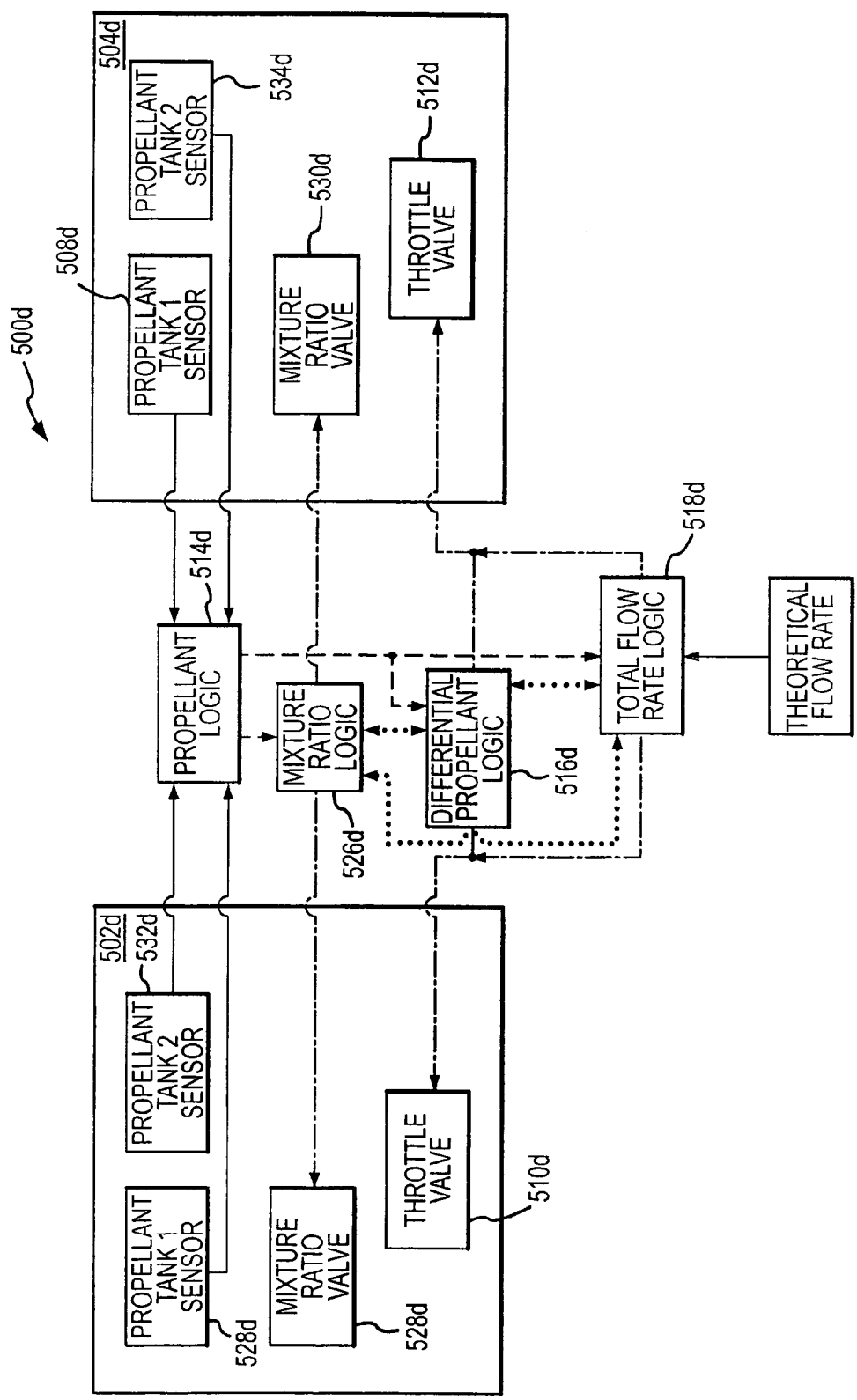
Figures 2, 5D:
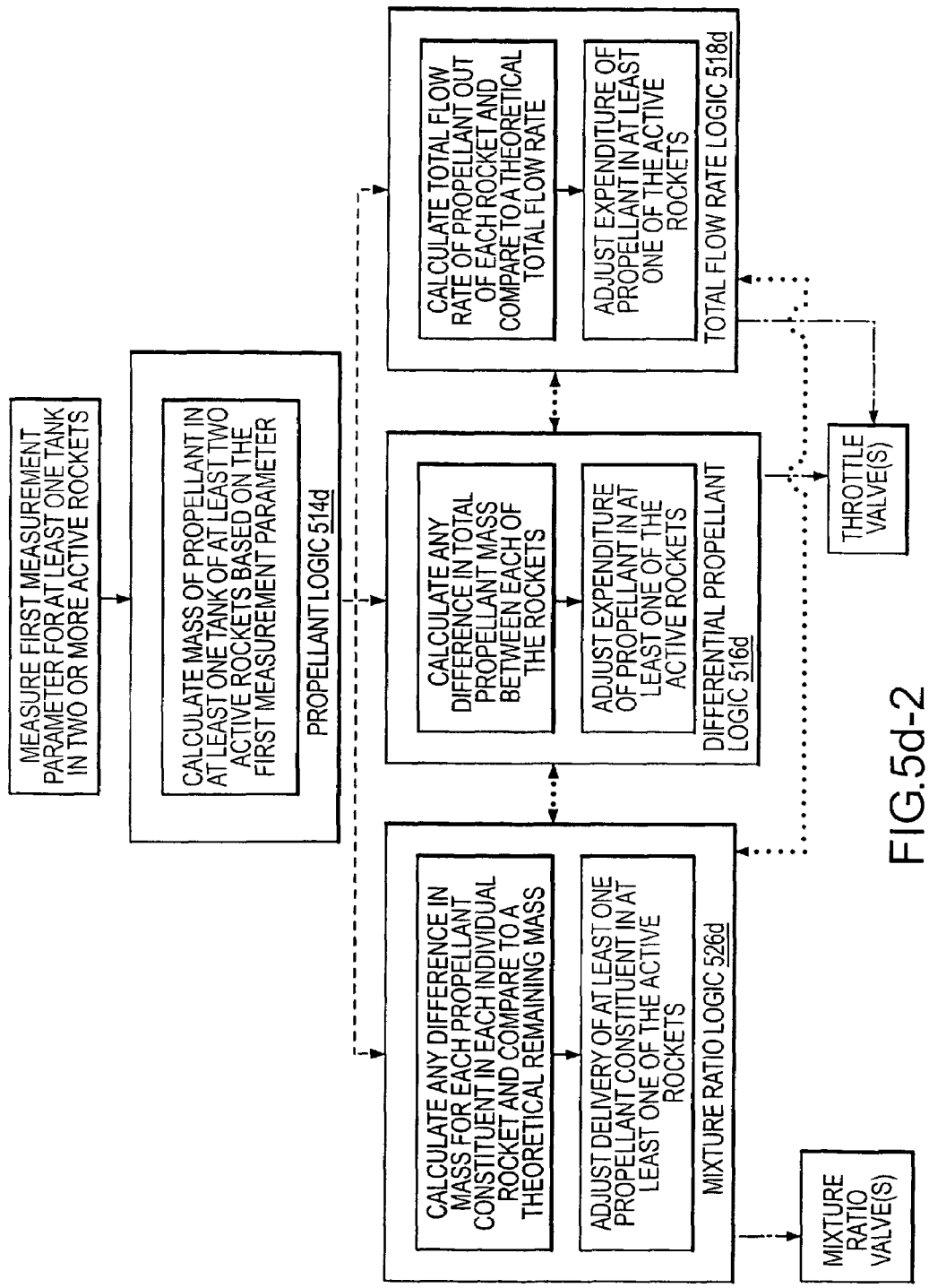

One embodiment of a launch vehicle that uses a differential propellant logic, a total flow rate logic, and a mixture ratio logic is illustrated in FIG. 5d-1 and is identified by reference numeral 500d. The launch vehicle 500d comprises a first rocket 502d and a second rocket 504d (any number of multiple booster rockets could be used by the launch vehicle 500d), with the rockets 502d, 504d including at least tank sensors 506d, 532d and 508d, 534d, a throttle valve 510d, 512d and a mixture ratio valve 528, 530, respectively. Propellant logic 514d may be operatively connected to the tank sensors 506d, 508d, 532d, 534d, differential propellant logic 516d, total flow rate logic 518d and/or mixture ratio logic 526d, as described above. The differential propellant logic 516d and total flow rate logic 518d may each be operatively connected to throttle valves 510d, 512d. The mixture ratio logic 526d may be operatively connected to the mixture ratio valves 528d, 530d. In one approach, the differential propellant logic 516d, total flow rate logic 518d, and/or mixture ratio logic 526d are also operatively connected, as depicted by the dotted lines.

The operation of the launch depicted in FIG. 5d-1 will now be described in relation to FIG. 5d-1. Tank sensors measure the first measurement parameter for at least one tank in at least two of the active rockets and such information is provided to the propellant logic 514d. In one approach, the tank sensors measure the first measurement parameter for each tank in each of the plurality of active rockets. The propellant logic 514d calculates the mass of propellant in at least one tank of at least two of the active rockets based on the first measurements parameter and may provide such information to the differential propellant logic 516d, total flow rate logic 518d, and/or mixture ratio logic 526d over time. In one approach, the propellant logic 514d calculates the mass of propellant in each tank of each active rocket.

The differential propellant logic 516d may utilize the information received from the propellant logic 514d to calculate any difference in total propellant mass between each of the rockets and may adjust expenditure of propellant in at least one of the active rockets by sending signals to at least one of the throttle valves. The total flow rate logic 518d may utilize the information received from the propellant logic to calculate the total flow rate of propellant out of each rocket, compare such total flow rate calculations to a predetermined theoretical total flow rate value and may adjust expenditure of propellant in at least one of the active rockets by sending signals to at least one of the throttle valves. In one aspect of the present embodiment, the differential propellant logic 516d and total flow rate logic 518d may send their signals in serial to at least one of the throttle valves. In yet another approach of the present embodiment, the differential propellant logic 516d and total flow rate logic 518d may send their signals in parallel to at least one of the throttle valves, wherein the signals are combined prior to reaching the throttle valve to create a master throttle valve signal, as described above.

With continued reference to FIG. 5d-2, the mixture ratio logic 526d may utilize the information received from the propellant logic 514d to calculate any difference in mass between each propellant constituent in each individual rocket. The mixture ratio logic 526d may adjust delivery of at least one of the propellant constituents in at least one of the active rockets based on such calculating by sending signals to one or more of the mixture ratio valves 528d, 530d such that the two propellant constituents in an individual rocket (e.g., rocket 502d) are depleted simultaneously. As described above, the differential propellant logic 516d, total flow rate logic 518d and/or mixture ratio logic 526d may be operatively connected to communicate regarding the signals each is producing so that the other logic components may process such information in conjunction with any signals it produces.

Figures 1, 5E:
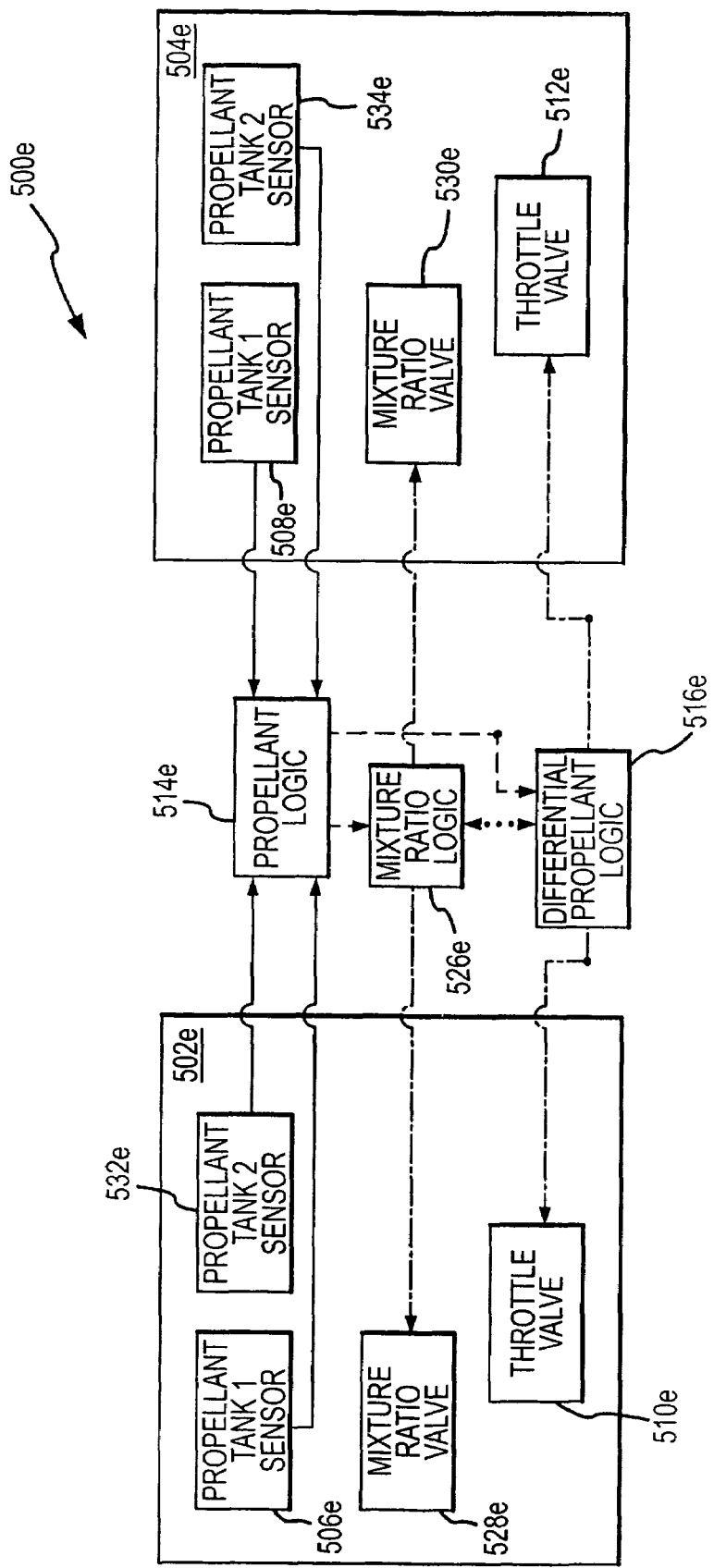
Figures 2, 5E:
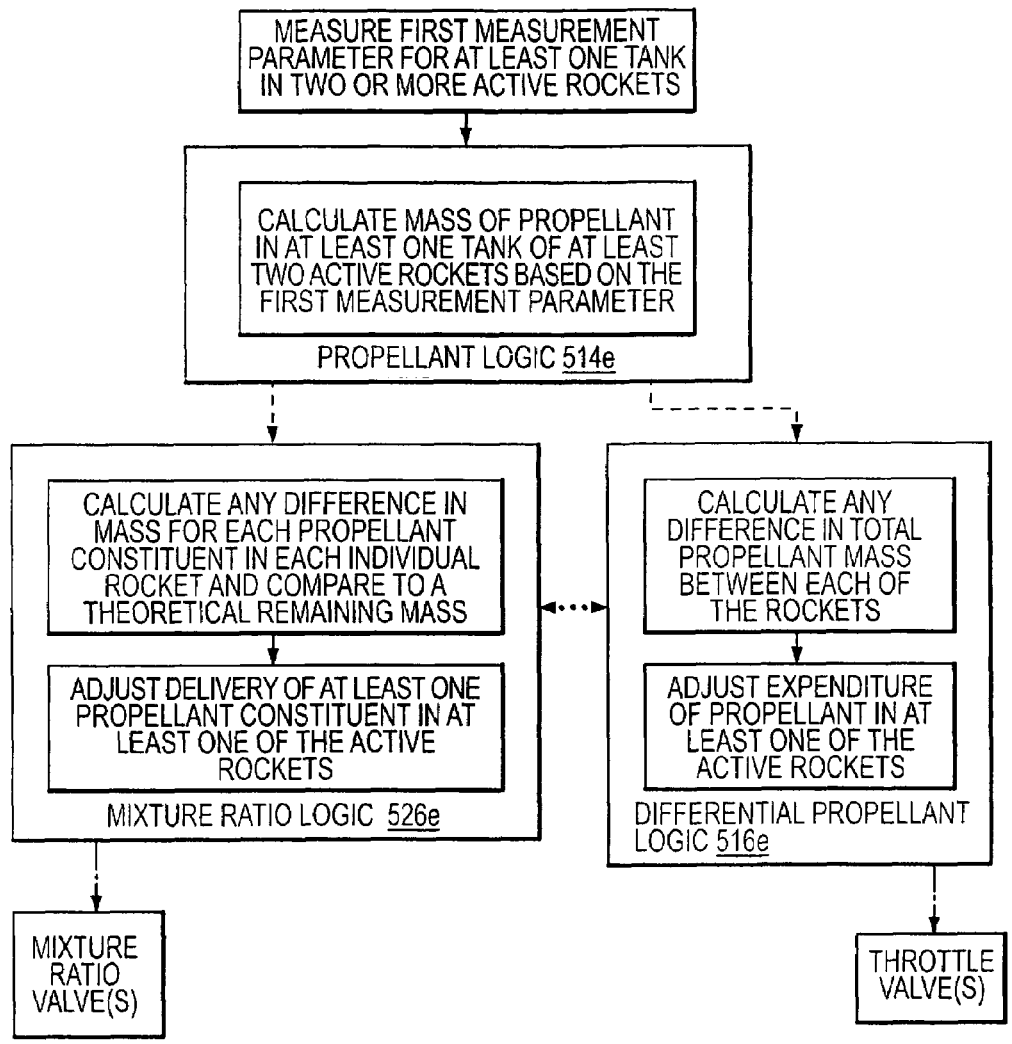

Another embodiment of a launch vehicle that uses both a mixture ratio logic and a differential propellant logic is illustrated in FIG. 5e-1 and is identified by reference numeral 500e. The launch vehicle 500e comprises a first rocket 502e and a second rocket 504e (any number of multiple booster rockets could be used by the launch vehicle 500e), with the rockets 502e, 504e including at least tank sensors 506e, 532e and 503e, 534e, a throttle valve 510e, 512e and a mixture ratio valve 528e, 530e, respectively. Propellant logic 514e may be operatively connected to the tank sensors 506e, 508e, 532e, 534e differential propellant logic 516e and/or mixture ratio logic 526e, as described above. The differential propellant logic 516e may be operatively connected to throttle valves 510e, 512e. The mixture ratio logic 506e may be operatively connected to the mixture ratio valves 528e, 530e. In one approach, the differential propellant logic 516e and mixture ratio logic 526e may also be operatively connected, as depicted by the dotted line.

The operation of the launch vehicle 500e depicted in FIG. 5e-1 will now be described in relation to FIG. 5e-2. Tank sensors measure the first measurement parameter for at least one tank in at least two of the active rockets and such information is provided to the propellant logic 514e. In one approach, the tank sensors measure the first measurement parameter for each tank in each of the plurality of active rockets. The propellant logic 514e calculates the mass of propellant in at least one tank of at least two of the active rockets based on the first measurements parameter and may provide such information to the differential propellant logic 516e and/or mixture ratio logic 526e over time. In one approach, the propellant logic 514e calculates the mass of propellant in each tank of each active rocket. The differential propellant logic 516e may utilize the information received from the propellant logic 514e to calculate any difference in total propellant mass between each of the rockets and may adjust expenditure of propellant in at least one of the active rockets by sending signals to at least one of the throttle valves. The mixture ratio logic 526e may utilize the information received from the propellant logic 514e to calculate any difference in mass between each propellant constituent in each individual rocket. The mixture ratio logic 526e may adjust delivery of at least one of the propellant constituents in at least one of the active rockets based on such calculating by sending signals to one or more of the mixture ratio valves 528e, 530e such that the two propellant constituents in an individual rocket (e.g., rocket 502e) are depleted simultaneously. As described above, the differential propellant logic 516e and mixture ratio logic 526e may be operatively connected to communicate regarding the signals each is producing so that the other logic components may process such information in conjunction with any signals it produces.

Figures 1, 5F:
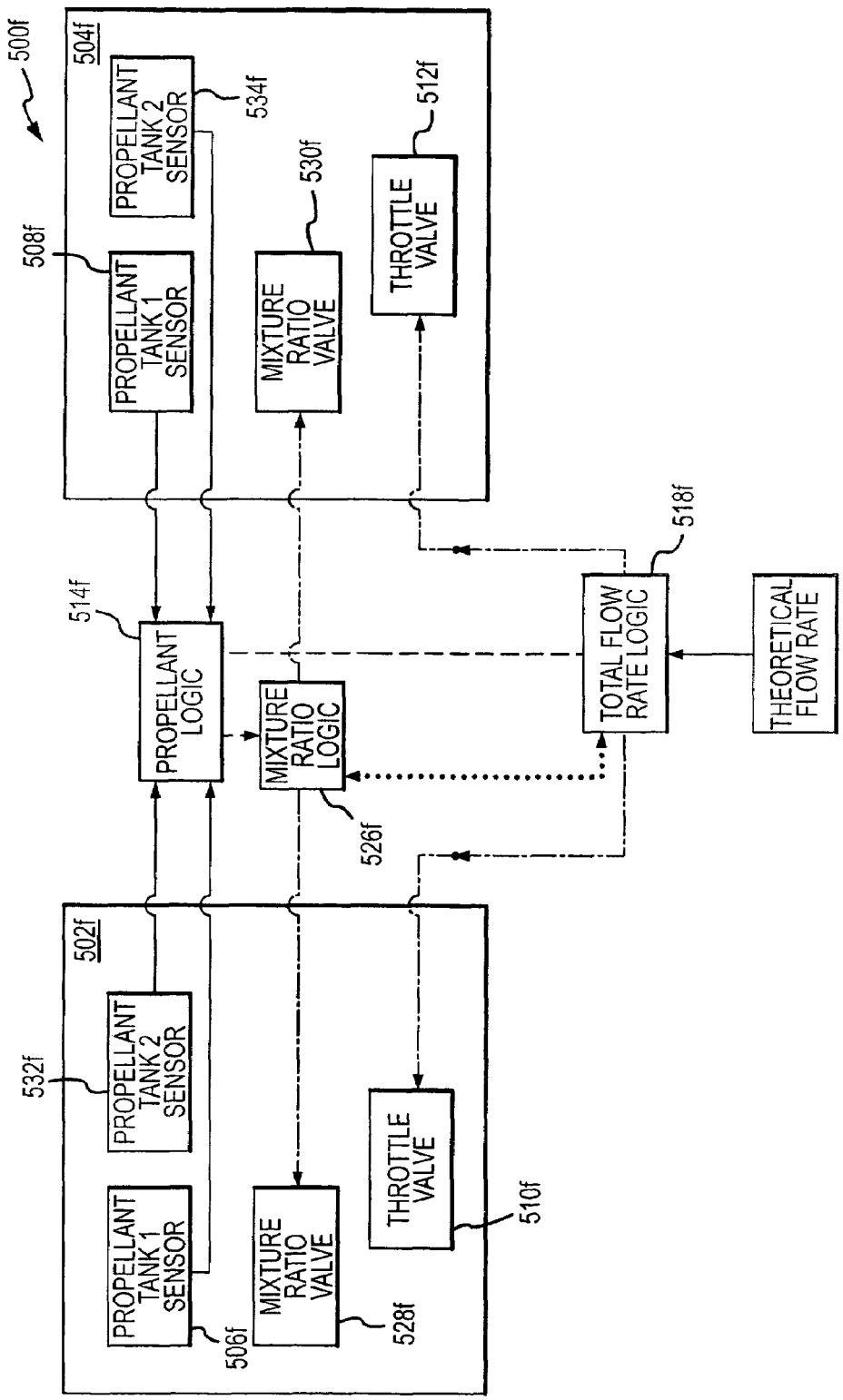
Figures 2, 5F:
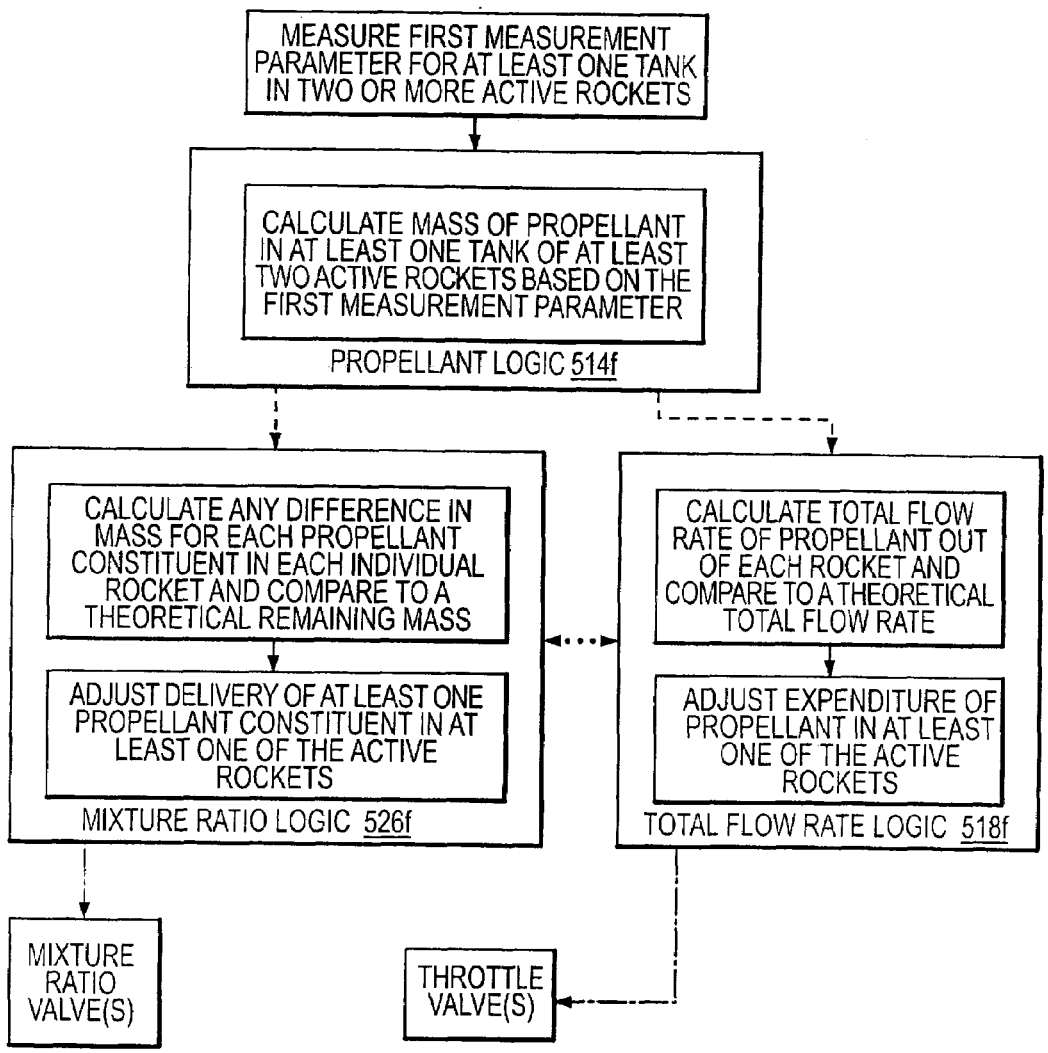

One embodiment of a launch vehicle that uses both a mixture ratio logic and a total flow rate logic is illustrated in FIG. 5f-1 and is identified by reference numeral 500f. The launch vehicle 500f comprises a first rocket 502f and a second rocket 504f (any number of multiple booster rockets could be used by the launch vehicle 500f), with the rockets 502f, 504f including at least tank sensors 506f, 532f and 508f, 534f, a throttle valve 510f, 512f and a mixture ratio valve 528f, 530f, respectively. Propellant logic 514f may be operatively connected to the tank sensors 506f, 508f, 532f, 534f, total flow rate logic 518f and/or mixture ratio logic 526f, as described above. The total flow rate logic 518f may be operatively connected to throttle valves 510f, 512f. The mixture ratio logic 506f may be operatively connected to the mixture ratio valves 528f, 530f. In one approach, the total flow rate logic 518f and mixture ratio logic 526f are also operatively connected, as depicted by the dotted line.

The operation of the launch vehicle depicted in FIG. 5f-1 will now be described in relation to FIG. 5f-2. Tank sensors measure the first measurement parameter for at least one tank in at least two of the active rockets and such information is provided to the propellant logic 514f. In one approach, the tank sensors measure the first measurement parameter for each tank in each of the plurality of active rockets. The propellant logic 514f calculates the mass of propellant in at least one tank of at least two of the active rockets based on the first measurements parameter and may provide such information to the total flow rate logic 518f, and/or mixture ratio logic 526f over time. In one approach, the propellant logic 514f calculates the mass of propellant in each tank of each active rocket. The total flow rate logic 518f may utilize the information received from the propellant logic to calculate the total flow rate of propellant out of each rocket, compare such total flow rate calculations to a predetermined theoretical total flow rate value and may adjust expenditure of propellant in at least one of the active rockets by sending signals to at least one of the throttle valves. The mixture ratio logic 526f may utilize the information received from the propellant logic 514f to calculate any difference in mass between each propellant constituent in each individual rocket. The mixture ratio logic 526f may adjust delivery of at least one of the propellant constituents in at least one of the active rockets based on such calculating by sending signals to one or more of the mixture ratio valves 528f, 530f such that the two propellant constituents in an individual rocket (e.g., rocket 502f) are depleted simultaneously. As described above, the total flow rate logic 518f and mixture ratio logic 526f may be operatively connected to communicate regarding the signals each is producing so that the other logic components may process such information in conjunction with any signals it produces.

Figures 1, 5G:
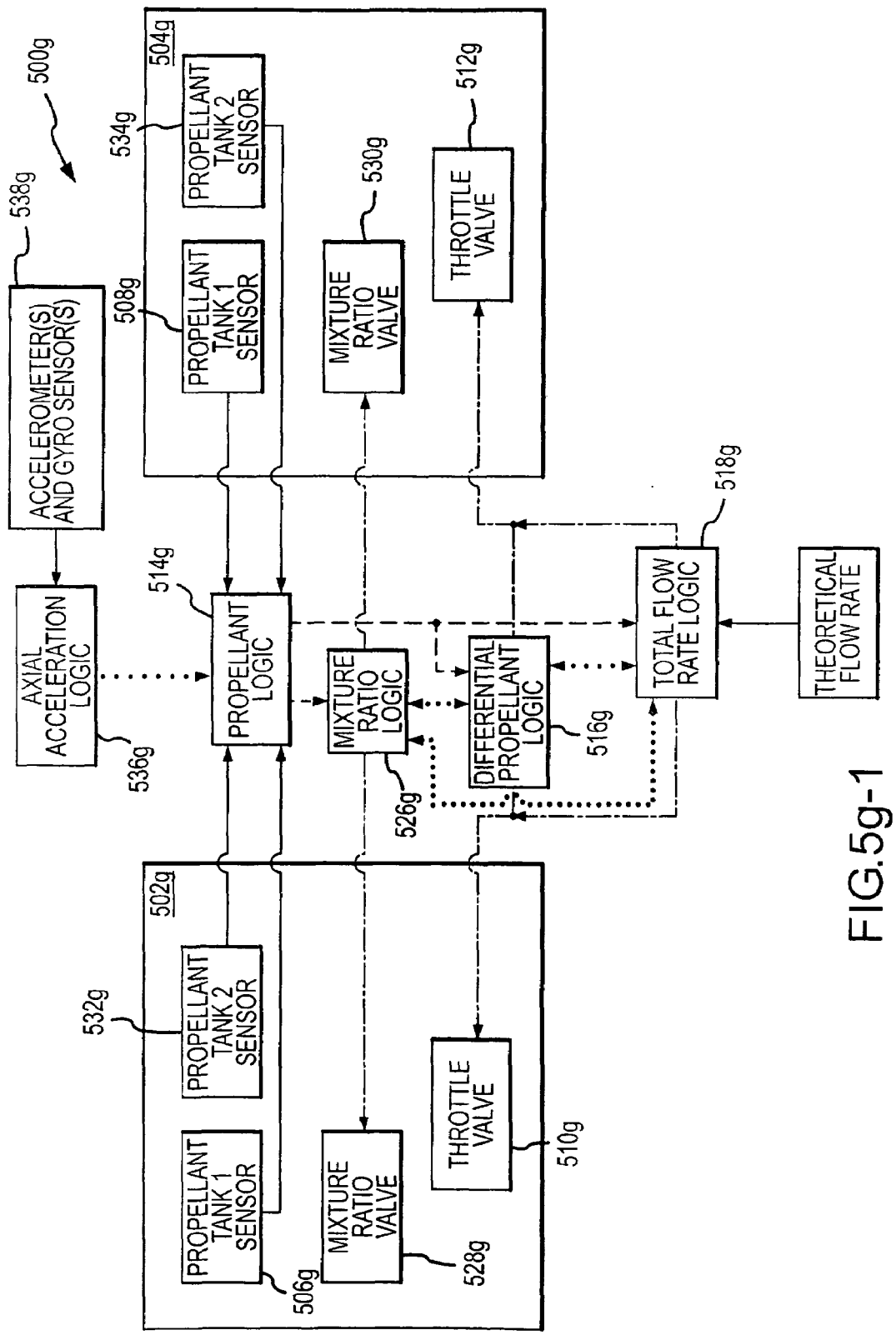
Figures 2, 5G:
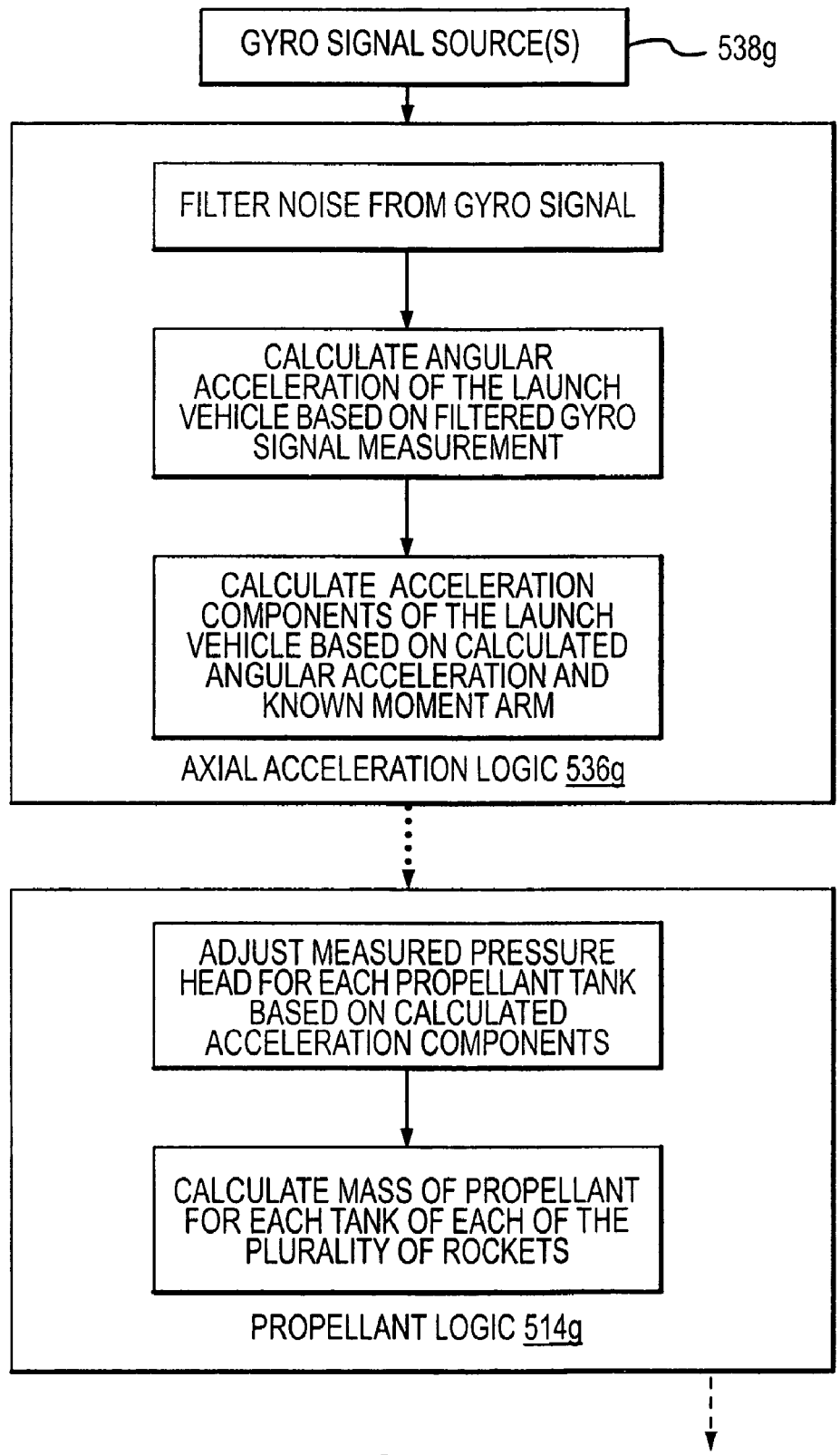
Figures 3, 5G:
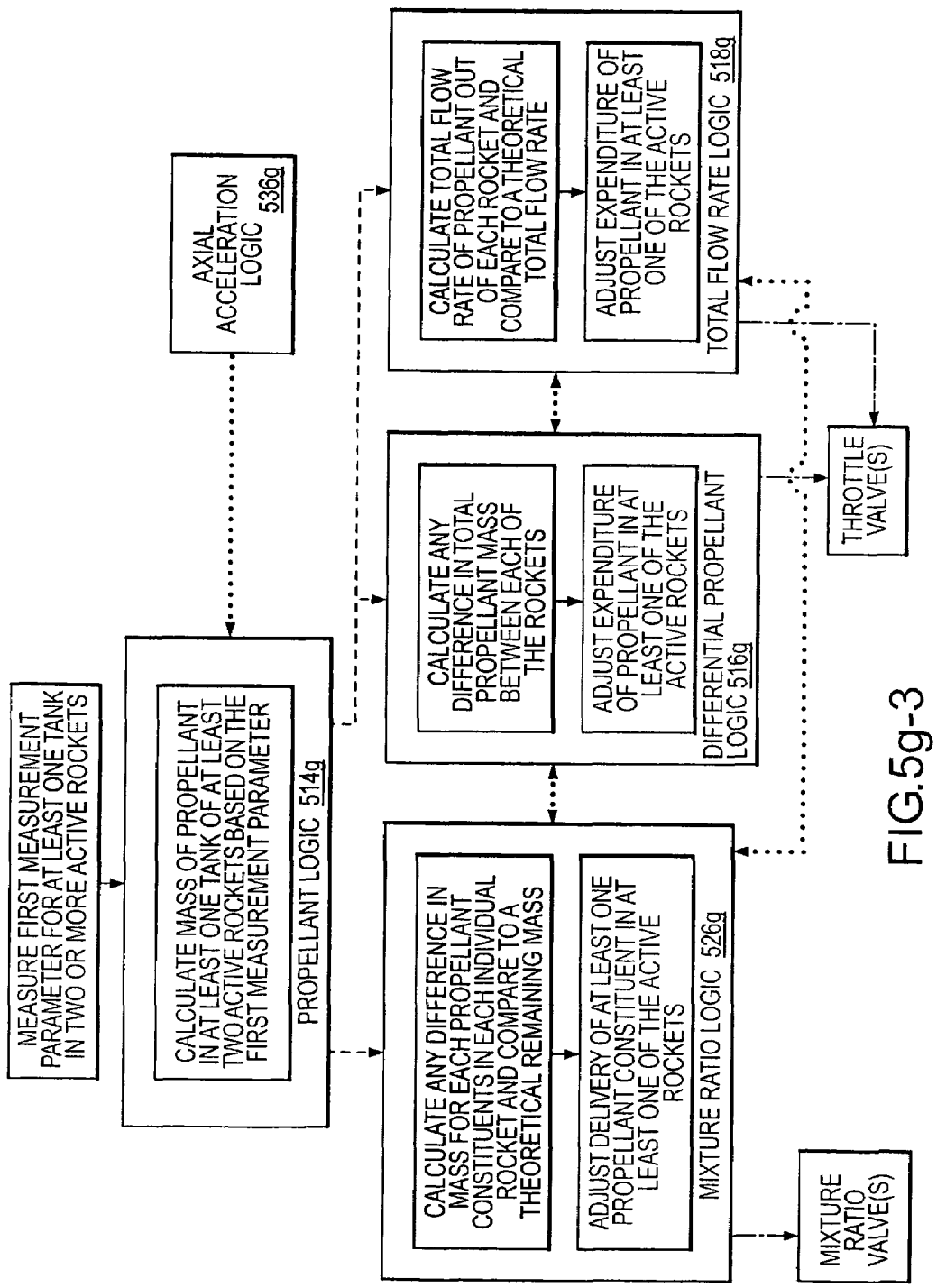

One embodiment of a launch vehicle that uses a mixture ratio logic, a total flow rate logic, a differential propellant logic, and an axial acceleration logic is illustrated in FIG. 5g-1 and is identified by reference numeral 500g. The launch vehicle 500g comprises a first rocket 502g and a second rocket 504g (any number of multiple booster rockets could be used by the launch vehicle 500a), with the rockets 502g, 504g including at least tank sensors 506g, 534g and 508g, 534g, a throttle valve 510g, 512g and a mixture ratio valve 528g, 530g, respectively. Propellant logic 514g may be operatively connected to tank sensors 506g, 508g, 532g, 534g, differential propellant logic 516g, total flow rate logic 518g, mixture ratio logic 526f and/or axial acceleration logic 536g, as described above. The differential propellant logic 516g and total flow rate logic 518g may each be operatively connected to throttle valves 510g, 512g. The mixture ratio logic 526g may be operatively connected to the mixture ratio valves 528g, 530g. The axial acceleration logic 536g may be operatively connected to the gyro signal source(s) 538g. In one approach, the differential propellant logic 516g, total flow rate logic 518g and/or mixture ratio logic 526g are also operatively connected.

The operation of the launch vehicle 500g depicted in FIG. 5g-1 will now be described in relation to FIGS. 5g-2 and 5g-3. Tank sensors measure the first measurement parameter for at least one tank in at least two of the active rockets and such information is provided to the propellant logic 514g. In one approach, the tank sensors measure the first measurement parameter for each tank in each of the plurality of active rockets. The axial acceleration logic 536g may receive acceleration information from the flight computer, which is operatively connected to an accelerometer and gyro signal source (s) 538g, and may be adapted to process such information received to compute the axial acceleration of the launch vehicle 500g and the angular acceleration of each of the various liquid booster rockets, as described above. With reference to FIG. 5g-2, gyro signal source(s) 538g may supply information relating to one or more gyro signals to the axial acceleration logic 536g. The axial acceleration logic, via the flight computer, 536g may filter noise from the gyro signals and calculate the angular acceleration of the launch vehicle and each of the liquid booster rockets based on a filtered gyro signal measurement. The axial acceleration of the launch vehicle 500g and each of the liquid booster rockets may be calculated by the axial acceleration logic 536g by multiplying the calculated angular acceleration of the launch vehicle ($\alpha$) by the known moment arm of the launch vehicle (r), as described above. The axial acceleration logic 536g may be operatively connected to the propellant logic 514g such that the propellant logic 514g is adapted to receive information relating to the calculated acceleration components (e.g., axial and angular acceleration) of the launch vehicle and each of the liquid booster rockets.

The propellant logic 514g may be adapted to process the calculated acceleration information supplied by the axial acceleration logic to adjust the measured liquid propellant pressure head readings for at least one tank in at least one of the active rockets, which may reduce the error associated with the pressure head reading for that tank due to the axial and/or angular acceleration of the launch vehicle, as described above. In one approach, the propellant logic adjusts the measured liquid propellant pressure head readings for each tank in each active rocket, which may reduce the error associated with the pressure head readings for each tank in each active rocket. The propellant logic 514g may then calculate and supply corresponding mass information to the differential propellant logic 516g, total low rate logic 518g and/or mixture ratio logic 526g, as described above.

Figure 6:
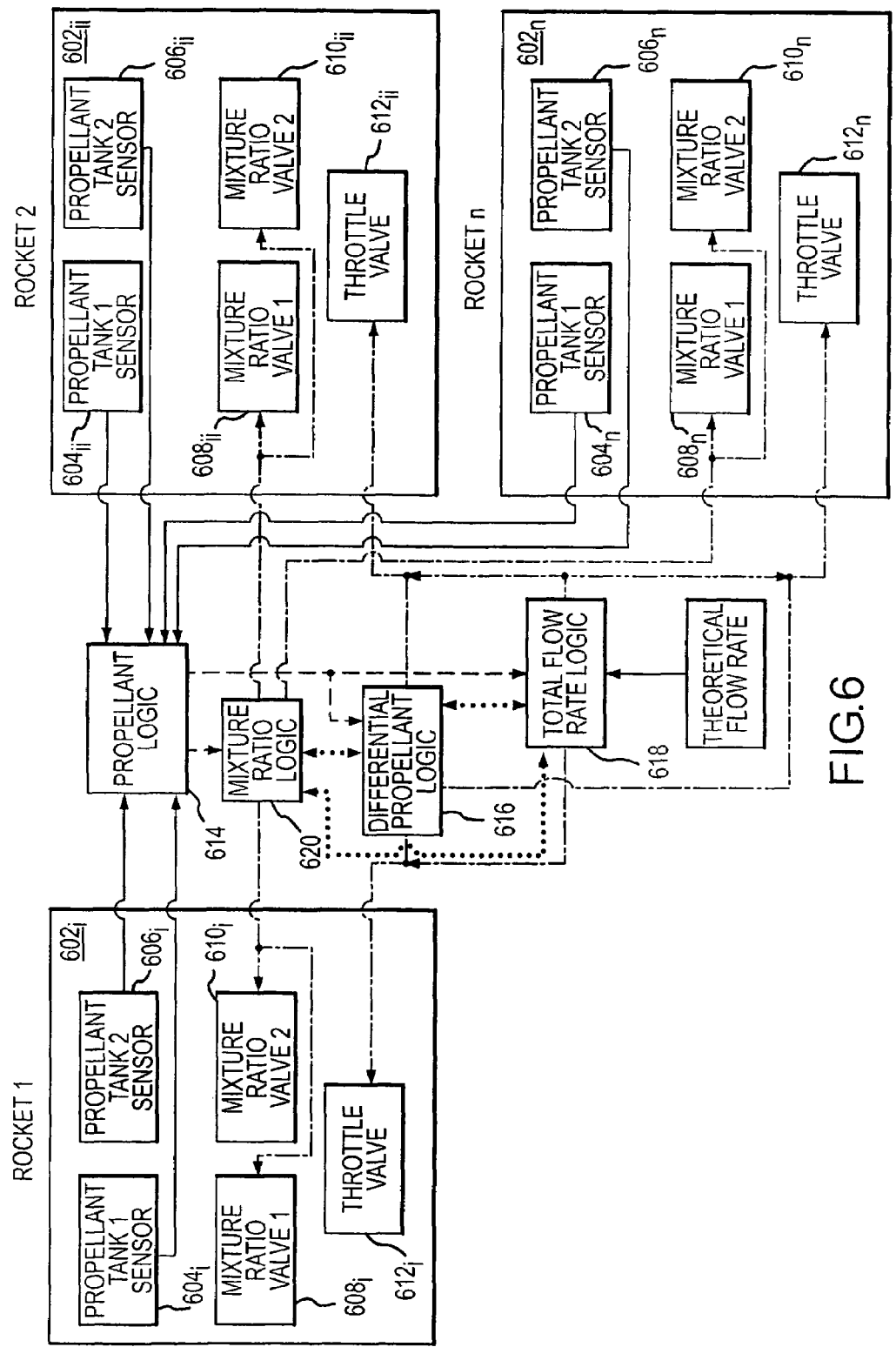
FIG. 6 illustrates one embodiment of a launch vehicle having at least three liquid booster rockets and that uses the propellant management system of FIG. 4.

It will be appreciated that while the launch vehicle has primarily been described with respect to use of two rockets in the first thrust source, any number of liquid propellant rockets may be utilized in accordance with the present invention. As depicted in FIG. 6, the first thrust source of the launch vehicle may comprise a plurality of propellant rockets $602_i$, $602_{ii}$ ... $602_n$ ("$602_{i-n}$"). Each of the liquid propellant rockets may comprise a first tank sensor $604_i$, $604_{ii}$ ... $604_n$ ("$604_{i-n}$"), a second tank sensor $606_i$, $606_{ii}$ ... $606_n$ ("$606_{i-n}$"), a first mixture ratio valve $608_i$, $608_{ii}$ ... $608_n$ ("$608_{i-n}$"), a second mixture ratio valve $610_i$, $610_{ii}$ ... $610_n$ ("$610_{i-n}$") and a throttle valve $612_i$, $612_{ii}$ ... $612_n$ ("$612_{i-n}$"), respectively. The tank sensors $602_{i-n}$, $604_{i-n}$ may be operatively connected to the propellant logic 614, as described above. The throttle valve(s) $612_{i-n}$ may be operatively connected to the differential logic 616 and/or the total flow rate logic 618. The mixture ratio valves $608_{i-n}$, $610_{i-n}$ may be operatively connected to the mixture ratio logic 620. The propellant logic 614 may be operatively interconnected to the differential logic 616, total flow rate logic 616, mixture ratio logic 620 and/or axial acceleration logic 622, as described above. Further, the differential logic 616, total flow rate logic 618 and/or mixture ratio logic 620 may be operatively interconnected to one another, as described above. Axial acceleration logic may be operatively interconnected to gyro signal source(s) 624 and the propellant logic 614, as described above. The first mixture ratio valves $608_{i-n}$ may be disposed in a first propellant constituent flow line (e.g., a flow line fluidly connected and in fluid communication with a first propellant tank and a combustion chamber) and the second mixture ratio valves $610_{i-n}$ may be disposed in a second propellant constituent flow line (e.g., a flow line fluidly connected and in fluid communication with a second propellant tank and a combustion chamber). Operation of the launch vehicle may proceed, as described above.

It will be appreciated that various different combinations of logics, valves and sensors may be employed and that all such combinations are within the scope of the present invention, although not specifically depicted or discussed herein. For example, the it will be appreciated that the launch vehicle could employ the axial acceleration logic with the propellant logic and also employ any one or more of the differential logic, total flow rate logic and/or mixture ratio logic. It will also be appreciated that the launch vehicle could employ the axial acceleration logic with the propellant logic without employing any of the differential logic, total flow rate logic or mixture ratio logic. It will also be appreciated that while reference has been primarily made to the use of a single throttle valve, two or more throttle valves could be used, such as one in each of the precombustion zone feed lines for each of the propellant constituents. In yet another approach, the throttle valve and mixture ratio valves could be disposed in the feed lines for the liquid oxygen propellant instead of the rocket fuel. Also, while reference has been made to a the use of a single propellant logic, differential logic, total flow rate logic, mixture ratio logic and axial acceleration logic within the launch vehicle, it will be appreciated that two or more of each of these logics could be employed in a single launch vehicle. Also, while the propellant management apparatus, method and system has primarily been described in relation to the first stage of a launch vehicle, it will be appreciated that the apparatus, method and system could be employed with any stage of a launch vehicle and/or space vehicle that utilizes two or more liquid propellant rockets as a thrust source.

Moreover, while various embodiments of the present invention have been described in detail, it is apparent that modifications and adaptations to those embodiments will occur to those skilled in the art. It is to be expressly understood, however, that such modifications and adaptations are within the scope of the present invention, as set forth in the claims below. Further, it should be recognized that any feature of any embodiment disclosed herein can be combined with any other feature of any other embodiment in any combination.

What is claimed is:

1. A launch vehicle, comprising:
   a plurality of liquid booster rockets comprising first and second boosters, wherein each said booster comprises:
   a first tank comprising a first propellant constituent;
   a second tank comprising a second propellant constituent; and
   a throttle regulator valve fluidly interconnected with said first and second tanks, wherein said throttle regulator valve controls a thrust of its corresponding said booster; and
   a differential propellant logic that is operatively interconnected with said throttle regulator valve of said first and second boosters, wherein said differential propellant logic outputs a first differential propellant control signal to said throttle regulator valve of said first booster based at least in part upon there being difference in an amount of said first propellant constituent associated with said first booster and an amount of said first propellant constituent associated with said second booster.

2. The launch vehicle of claim 1, wherein said first propellant constituent is one of an oxidizer and a fuel, and said second propellant constituent is the other of said oxidizer and said fuel.

3. The launch vehicle of claim 1, wherein each said booster further comprises:
   means for determining an amount of said first propellant constituent in said first tank of each of said plurality of liquid booster rockets, wherein said differential propellant logic is operatively interconnected with said means for determining of said first booster and means for determining of said second booster.

4. The launch vehicle of claim 1, wherein each said booster further comprises:
   first means for determining a mass of said first propellant constituent in said first tank and second means for determining a mass of said first propellant constituent in said second tank, wherein said differential propellant logic is operatively interconnected with said first and second means for determining.

5. The launch vehicle of claim 1, further comprising:
   a first total flow rate logic that is operatively interconnected with said throttle regulator valve of said first booster, wherein said first total flow rate logic outputs a first total flow rate control signal to said throttle regulator valve of said first booster based upon a difference between a theoretical total propellant flow rate associated with said first booster and an actual total propellant flow rate associated with said first booster; and
   a second total flow rate logic that is operatively interconnected with said throttle regulator valve of said second booster, and wherein said second total flow rate logic outputs a second total flow rate control signal to said throttle regulator valve of said second booster based upon a difference between a theoretical total propellant flow rate associated with said second booster and an actual total propellant flow rate associated with said second booster.

6. The launch vehicle of claim 5, wherein each said booster further comprises a first mixture ratio valve, wherein said launch vehicle further comprises:
   a mixture ratio logic operatively interconnected with said first mixture ratio valve of said first and second boosters, wherein said mixture ratio logic operatively interfaces with said first mixture ratio valve of said first booster so that said first and second propellant constituents of said first booster are at least substantially simultaneously depleted, and wherein said mixture ratio logic further operatively interfaces with said first mixture ratio valve of said second booster so that said first and second propellant constituents of said second booster are at least substantially simultaneously depleted.

7. The launch vehicle of claim 1, further comprising:
   first means for operating said throttle regulator valve of said first booster to account for a difference between a theoretical total propellant flow rate associated with said first booster and an actual total propellant flow rate associated with said first booster; and
   second means for operating said throttle regulator valve of said second booster to account for a difference between a theoretical total propellant flow rate associated with said second booster and an actual total propellant flow rate associated with said second booster.

8. The launch vehicle of claim 7, wherein each said booster comprises a first mixture ratio valve, wherein said launch vehicle further comprises:
   third means for operating said first mixture ratio valve of said first booster so that said first and second propellant constituents of said first booster are at least substantially simultaneously depleted; and
   fourth means for operating said first mixture ratio valve of said second booster so that said first and second propellant constituents of said second booster are at least substantially simultaneously depleted.

9. The launch vehicle of claim 1, further comprising:
   means for calculating an amount of said first propellant constituent in each of said first and second boosters, wherein said means for calculating comprises means for accounting for an angular acceleration of said launch vehicle.

10. The launch vehicle of claim 1, wherein each said booster further comprises:
    first mass determination logic associated with said first tank; and
    second mass determination logic associated with said second tank, wherein said first and second mass determination logics are each operatively interconnected with said differential propellant logic.

11. The launch vehicle of claim 10, further comprising:
    an axial acceleration logic that addresses an angular acceleration of said launch vehicle, wherein said axial acceleration logic is operatively interconnected with said first mass determination logic and said second mass determination logic.

12. The launch vehicle of claim 1, further comprising:
    an axial acceleration logic that addresses an angular acceleration of said launch vehicle and that is operatively interconnected with said differential propellant logic.

13. A launch vehicle, comprising:
    a thrust source comprising a plurality of rockets, wherein each of said plurality of rockets comprises:
      a tank containing a propellant constituent;
      a tank sensor at least operably interconnected with said tank; and
      a throttle valve fluidly interconnected with said tank, wherein said throttle valve controls a thrust of said rocket;
    propellant logic operably interconnected with said tank sensor of each of said plurality of rockets, wherein said propellant logic is adapted to calculate an amount of said propellant constituent in each of said plurality of rockets;
    differential propellant logic operably interconnected with said propellant logic and said throttle valve of each of said plurality of rockets, wherein said differential propellant logic is adapted to calculate a difference in said amount of said propellant constituent between each of said plurality of rockets, and wherein said differential propellant logic is adapted to send a first signal to said throttle valve of at least one of said plurality of rockets to account for said difference;
    a plurality of gyro sensors; and
    axial acceleration logic operably interconnected with said plurality of gyro sensors and said propellant logic, wherein said axial acceleration logic is adapted to calculate an axial acceleration based upon an angular acceleration of said launch vehicle and send an axial acceleration adjustment signal to said propellant logic, wherein said propellant logic is further adapted to use said axial acceleration adjustment signal in calculating said amount of said propellant constituent in said tank of each of said plurality of rockets.

14. The launch vehicle of claim 13, wherein said propellant constituent comprises an oxidizer.

15. The launch vehicle of claim 13, wherein said propellant constituent comprises a fuel.

16. The launch vehicle of claim 13, further comprising:
    total flow rate logic operably interconnected with said propellant logic and said throttle valve of each of said plurality of rockets, wherein said total flow rate logic is adapted to calculate a difference between a theoretical total propellant flow rate and an actual total propellant flow rate for each of said plurality of rockets, and wherein said total flow rate logic is adapted to send a second signal to said throttle valve of each of said plurality of rockets if a corresponding said difference is more than a predetermined amount.

17. The launch vehicle of claim 13, wherein said tank is a first tank and said propellant constituent is a first propellant constituent;
    wherein each of said plurality of rockets further comprises:
      a second tank containing a second propellant constituent, wherein said throttle valve for each of said plurality of rockets is fluidly interconnected with its corresponding said first and second tanks; and
      a second tank sensor at least operably interconnected with said second tank.

18. The launch vehicle of claim 17, wherein said propellant logic is operably interconnected with said second tank sensor of each of said plurality of rockets.

19. The launch vehicle of claim 17, wherein said first propellant constituent is an oxidizer and wherein said second propellant constituent is a fuel.

20. The launch vehicle of claim 17, wherein each of said plurality of rockets comprises:
    a first mixture ratio valve in fluid communication with said first and second tanks.

21. The launch vehicle of claim 20, further comprising:
    mixture ratio logic operably interconnected with said propellant logic and said first mixture ratio valve of each of said plurality of rockets, wherein said mixture ratio logic is adapted to compare an amount of said first propellant constituent and an amount of said second propellant constituent for each of said plurality of rockets, and wherein said mixture ratio logic operatively interfaces with said first mixture ratio valve of each of said plurality of rockets so that said first propellant constituent and said second propellant constituent in each said rocket are at least substantially simultaneously depleted.

22. The launch vehicle of claim 17, further comprising:
    total flow rate logic operably interconnected with said propellant logic and said throttle valve of each of said plurality of rockets, wherein said total flow rate logic is adapted to calculate a difference between a theoretical total propellant flow rate and an actual total propellant flow rate for each of said plurality of rockets, and wherein said total flow rate logic is adapted to send a second signal to said throttle valve of each of said plurality of rockets if a corresponding said difference is more than a predetermined amount.

23. A launch vehicle, comprising:
    a thrust source comprising a plurality of rockets, wherein each of said plurality of rockets comprises:
      a first tank containing a first propellant constituent;

a second tank containing a second propellant constituent;
a first tank sensor at least operably interconnected with said first tank;
a second tank sensor at least operably interconnected with said second tank;
a throttle valve fluidly interconnected with said first and second tanks, wherein said throttle valve controls a thrust of said rocket; and
a first mixture ratio valve in fluid communication with said first and second tanks;
propellant logic operably interconnected with said tank sensors of each of said plurality of rockets, wherein said propellant logic is adapted to calculate an amount of said propellant constituents in each of said plurality of rockets;
differential propellant logic operably interconnected with said propellant logic and said throttle valve of each of said plurality of rockets, wherein said differential propellant logic is adapted to calculate a difference in said amount of said propellant constituents between each of said plurality of rockets, and wherein said differential propellant logic is adapted to send a first signal to said throttle valve of at least one of said plurality of rockets to account for said difference; and
mixture ratio logic operably interconnected with said propellant logic and said first mixture ratio valve of each of said plurality of rockets, wherein said mixture ratio logic is adapted to compare an amount of said first propellant constituent and an amount of said second propellant constituent for each of said plurality of rockets, and wherein said mixture ratio logic operatively interfaces with said first mixture ratio valve of each of said plurality of rockets so that said first propellant constituent and said second propellant constituent in each said rocket are at least substantially simultaneously depleted.

24. The launch vehicle of claim 23, wherein said first propellant constituent comprises an oxidizer.

25. The launch vehicle of claim 23, wherein said second propellant constituent comprises a fuel.

26. The launch vehicle of claim 23, further comprising:
total flow rate logic operably interconnected with said propellant logic and said throttle valve of each of said plurality of rockets, wherein said total flow rate logic is adapted to calculate a difference between a theoretical total propellant flow rate and an actual total propellant flow rate for each of said plurality of rockets, and wherein said total flow rate logic is adapted to send a second signal to said throttle valve of each of said plurality of rockets if a corresponding said difference is more than a predetermined amount.

27. The launch vehicle of claim 23, wherein said propellant logic is operably interconnected with said second tank sensor of each of said plurality of rockets.

28. The launch vehicle of claim 23, wherein said first propellant constituent is an oxidizer and wherein said second propellant constituent is a fuel.

29. The launch vehicle of claim 23, further comprising:
total flow rate logic operably interconnected with said propellant logic and said throttle valve of each of said plurality of rockets, wherein said total flow rate logic is adapted to calculate a difference between a theoretical total propellant flow rate and an actual total propellant flow rate for each of said plurality of rockets, and wherein said total flow rate logic is adapted to send a second signal to said throttle valve of each of said plurality of rockets if a corresponding said difference is more than a predetermined amount.

30. The launch vehicle of claim 23, further comprising:
a plurality of gyro sensors; and
axial acceleration logic operably interconnected with said plurality of gyro sensors and said propellant logic, wherein said axial acceleration logic is adapted to calculate an axial acceleration based upon an angular acceleration of said launch vehicle and send an axial acceleration adjustment signal to said propellant logic, wherein said propellant logic is further adapted to use said axial acceleration adjustment signal in calculating said amount of said propellant constituents in said tank of each of said plurality of rockets.

31. A launch vehicle, comprising:
a thrust source comprising a plurality of rockets, wherein each of said plurality of rockets comprises:
a first tank containing a first propellant constituent;
a second tank containing a second propellant constituent;
a first tank sensor at least operably interconnected with said first tank;
a second tank sensor at least operably interconnected with said second tank; and
a throttle valve fluidly interconnected with said first and second tanks, wherein said throttle valve controls a thrust of said rocket;
propellant logic operably interconnected with said first tank sensor of each of said plurality of rockets, wherein said propellant logic is adapted to calculate an amount of said propellant constituent in each of said plurality of rockets;
differential propellant logic operably interconnected with said propellant logic and said throttle valve of each of said plurality of rockets, wherein said differential propellant logic is adapted to calculate a difference in said amount of said propellant constituents between each of said plurality of rockets, and wherein said differential propellant logic is adapted to send a first signal to said throttle valve of at least one of said plurality of rockets to account for said difference; and
total flow rate logic operably interconnected with said propellant logic and said throttle valve of each of said plurality of rockets, wherein said total flow rate logic is adapted to calculate a difference between a theoretical total propellant flow rate and an actual total propellant flow rate for each of said plurality of rockets, and wherein said total flow rate logic is adapted to send a second signal to said throttle valve of each of said plurality of rockets if a corresponding said difference is more than a predetermined amount.

32. The launch vehicle of claim 31, wherein said first propellant constituent comprises an oxidizer.

33. The launch vehicle of claim 31, wherein said second propellant constituent comprises a fuel.

34. The launch vehicle of claim 31, wherein said propellant logic is operably interconnected with said second tank sensor of each of said plurality of rockets.

35. The launch vehicle of claim 31, wherein said first propellant constituent is an oxidizer and wherein said second propellant constituent is a fuel.

36. The launch vehicle of claim 31, wherein each of said plurality of rockets comprises:
a first mixture ratio valve in fluid communication with said first and second tanks.

* * * * *